(12) United States Patent
Osborne

(10) Patent No.: US 9,973,680 B2
(45) Date of Patent: *May 15, 2018

(54) AUTO-FOCUS IN LOW-PROFILE FOLDED OPTICS MULTI-CAMERA SYSTEM

(71) Applicant: QUALCOMM Incorporated, San Diego, CA (US)

(72) Inventor: Thomas Wesley Osborne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/170,589

(22) Filed: Jun. 1, 2016

(65) Prior Publication Data

US 2016/0353008 A1    Dec. 1, 2016

Related U.S. Application Data

(63) Continuation of application No. 14/676,669, filed on Apr. 1, 2015, now Pat. No. 9,383,550, which is a
(Continued)

(51) Int. Cl.
*H04N 5/232* (2006.01)
*G02B 7/09* (2006.01)
(Continued)

(52) U.S. Cl.
CPC .......... *H04N 5/23212* (2013.01); *G02B 7/09* (2013.01); *G02B 13/006* (2013.01);
(Continued)

(58) Field of Classification Search
CPC .. H04N 5/23212; H04N 5/2258; H04N 5/247; H04N 5/2253; H04N 5/2254;
(Continued)

(56) References Cited

U.S. PATENT DOCUMENTS

| 3,698,803 A | 10/1972 | Toshio |
| 4,114,171 A | 9/1978 | Altman |

(Continued)

FOREIGN PATENT DOCUMENTS

| CN | 101201459 A | 6/2008 |
| CN | 101571666 A | 11/2009 |

(Continued)

OTHER PUBLICATIONS

Arican, et al., "Intermediate View Generation for Perceived Depth Adjustment of Stereo Video", Mitsubishi Electric Research Laboratories, http://www.merl.com, TR2009-052, Sep. 2009; 12 pages.

(Continued)

*Primary Examiner* — Albert Cutler

(57) ABSTRACT

Embodiments of imaging systems and methods of autofocusing are disclosed, for example, using a folded optics configuration. One system includes at least one camera configured to capture a target image scene, including an image sensor comprising an array of sensor elements, a primary light folding surface configured to direct a portion of received light in a first direction, and an optical element having a secondary light folding surface directing light in a second direction. The system can also include a lens assembly having at least one stationary lens positioned between the secondary light folding surface and the image sensor, the at least one stationary lens having a first surface mechanically coupled to the optical element and a second surface mechanically coupled to the image sensor, and at least one movable lens positioned between the primary light folding surface and the optical element.

17 Claims, 31 Drawing Sheets

Related U.S. Application Data continuation-in-part of application No. 14/526,104, filed on Oct. 28, 2014, now Pat. No. 9,374,516.

(60) Provisional application No. 61/975,680, filed on Apr. 4, 2014, provisional application No. 62/015,364, filed on Jun. 20, 2014, provisional application No. 61/975,669, filed on Apr. 4, 2014.

(51) Int. Cl.
| | |
|---|---|
| G02B 17/08 | (2006.01) |
| H04N 5/247 | (2006.01) |
| H04N 5/225 | (2006.01) |
| G03B 3/10 | (2006.01) |
| G02B 13/00 | (2006.01) |
| G03B 13/34 | (2006.01) |
| H04N 9/097 | (2006.01) |
| G03B 17/17 | (2006.01) |
| G03B 13/36 | (2006.01) |

(52) U.S. Cl.
CPC ..... *G02B 13/0015* (2013.01); *G02B 13/0045* (2013.01); *G02B 13/0065* (2013.01); *G02B 17/0852* (2013.01); *G03B 3/10* (2013.01); *G03B 13/34* (2013.01); *G03B 13/36* (2013.01); *G03B 17/17* (2013.01); *H04N 5/2253* (2013.01); *H04N 5/2254* (2013.01); *H04N 5/2258* (2013.01); *H04N 5/247* (2013.01); *H04N 9/097* (2013.01)

(58) Field of Classification Search
CPC ...... H04N 9/097; G02B 7/09; G02B 17/0852; G02B 13/0045; G02B 13/0065; G02B 13/006; G02B 13/0015; G03B 3/10; G03B 13/34; G03B 17/17; G03B 13/36
See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 4,890,314 A | 12/1989 | Judd et al. | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A | 3/1993 | Kaneko et al. | |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A | 8/1998 | Nalwa | |
| 5,798,791 A | 8/1998 | Katayama et al. | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 | 7/2002 | Wick et al. | |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1 | 8/2004 | Avinash | |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2* | 2/2005 | Yokoi | A61B 1/041 348/68 |
| 6,861,633 B2 | 3/2005 | Osborn | |
| 6,862,364 B1 | 3/2005 | Berestov | |
| 6,987,534 B1 | 1/2006 | Seta | |
| 6,992,700 B1 | 1/2006 | Sato et al. | |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson et al. | |
| 7,860,214 B1 | 12/2010 | Haff | |
| 7,893,957 B2 | 2/2011 | Peters et al. | |
| 7,961,398 B2 | 6/2011 | Tocci | |
| 7,978,222 B2 | 7/2011 | Schneider | |
| 8,004,557 B2 | 8/2011 | Pan | |
| 8,098,276 B2 | 1/2012 | Chang et al. | |
| 8,115,813 B2 | 2/2012 | Tang | |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2 | 5/2013 | Ollila et al. | |
| 8,482,813 B2 | 7/2013 | Kawano et al. | |
| 8,791,984 B2 | 7/2014 | Jones et al. | |
| 8,836,693 B2 | 9/2014 | Katano | |
| 8,928,988 B1 | 1/2015 | Ford et al. | |
| 8,988,564 B2 | 3/2015 | Webster et al. | |
| 9,049,375 B2 | 6/2015 | Wade et al. | |
| 9,055,208 B2 | 6/2015 | Kim | |
| 9,185,296 B2 | 11/2015 | Wade et al. | |
| 9,264,610 B2 | 2/2016 | Duparre | |
| 9,294,672 B2 | 3/2016 | Georgiev et al. | |
| 9,316,810 B2 | 4/2016 | Mercado | |
| 9,332,188 B2 | 5/2016 | Takei et al. | |
| 9,602,806 B1 | 3/2017 | Stafford et al. | |
| 9,609,210 B2 | 3/2017 | Djordjevic et al. | |
| 2001/0028482 A1 | 10/2001 | Nishioka | |
| 2002/0070365 A1 | 6/2002 | Karellas | |
| 2002/0136150 A1 | 9/2002 | Mihara et al. | |
| 2003/0024987 A1 | 2/2003 | Zhu | |
| 2003/0034395 A1 | 2/2003 | Tsikos et al. | |
| 2003/0038814 A1 | 2/2003 | Blume | |
| 2003/0214575 A1 | 11/2003 | Yoshikawa | |
| 2004/0021767 A1 | 2/2004 | Endo et al. | |
| 2004/0051805 A1 | 3/2004 | Yoshikawa et al. | |
| 2004/0066449 A1 | 4/2004 | Givon | |
| 2004/0105025 A1 | 6/2004 | Scherling | |

(56) References Cited

U.S. PATENT DOCUMENTS

| | | |
|---|---|---|
| 2004/0183907 A1 | 9/2004 | Hovanky et al. |
| 2004/0195492 A1* | 10/2004 | Hsin ................. H01L 31/0203 |
| | | 250/214.1 |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2005/0243175 A1 | 11/2005 | Yamada et al. |
| 2005/0253951 A1 | 11/2005 | Fujimoto et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0061660 A1 | 3/2006 | Brackmann |
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1* | 2/2007 | Konno ..................... G02B 5/04 |
| | | 348/337 |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030573 A1 | 2/2008 | Ritchey |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268210 A1 | 10/2009 | Prince |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1 | 2/2011 | Wang et al. |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1* | 2/2013 | McDowall ......... G02B 27/0075 |
| | | 348/45 |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1* | 9/2013 | Ki ....................... H04N 5/23238 |
| | | 348/36 |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0329015 A1 | 12/2013 | Pulli et al. |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2014/0340568 A1 | 11/2014 | Sano et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |

(56) References Cited

U.S. PATENT DOCUMENTS

| | | |
|---|---|---|
| 2015/0373252 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De Leon et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0373263 A1 | 12/2016 | Zaidi et al. |
| 2017/0026570 A1 | 1/2017 | Shepard et al. |
| 2017/0038502 A1 | 2/2017 | Georgiev |
| 2017/0118421 A1 | 4/2017 | Georgiev |

FOREIGN PATENT DOCUMENTS

| | | |
|---|---|---|
| CN | 101581828 A | 11/2009 |
| CN | 101867720 A | 10/2010 |
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | S60213178 A | 10/1985 |
| JP | H06217184 A | 8/1994 |
| JP | H06251127 A | 9/1994 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | H09214992 A | 8/1997 |
| JP | H10142490 A | 5/1998 |
| JP | 2001194114 A | 7/2001 |
| JP | 2002158913 A | 5/2002 |
| JP | 2003304561 A | 10/2003 |
| JP | 2004260787 A | 9/2004 |
| JP | 3791847 B1 | 6/2006 |
| JP | 2006279538 A | 10/2006 |
| JP | 2007147457 A | 10/2006 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20080071400 A | 8/2008 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6, pp. 649-653.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-131, Feb. 1989.

International Search Report and Written Opinion—PCT/US2015/024121—ISA/EPO—dated Jun. 10, 2015.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Ricoh Imagine Change: "New Ricoh Theta Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Sun W.S., et al., "Single-Lens Camera Based on a Pyramid Prism Array to Capture Four Images," Optical Review, 2013, vol. 20 (2), pp. 145-152.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Meng et al., "Single-shot Specular Surface Reconstruction with Gonio-plenoptic Imaging," 2015 IEEE International Conference on Computer Vision; pp. 3433-3441.

Chowdhury A., et al., "Challenges of Megapixel Camera Module Assembly and Test," Electronic Components and Technology Conference, 2005, pp. 1390-1401.

\* cited by examiner

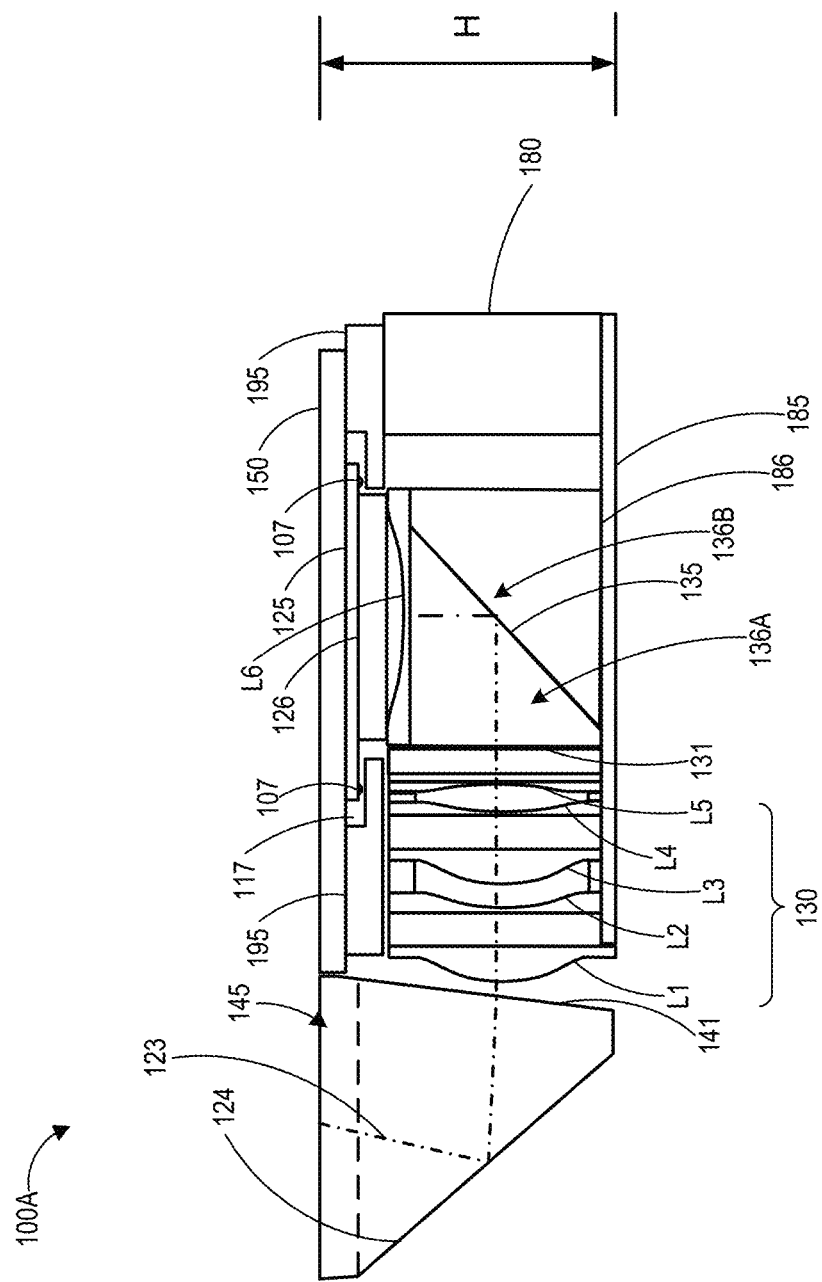

| Nyquist Rates | Cyc/mm | Cyc/mm | Cyc/mm |
|---|---|---|---|
| Nyquist [2pix/cyc] | 357 | 454 | 1000 |
| 1/2 Nyquist [4pix/cyc] | 178 | 227 | 500 |
| 1/4 Nyquist [8pix/cyc] | 89 | 114 | 250 |

AUTO-FOCUS IN LOW-PROFILE FOLDED OPTICS MULTI-CAMERA SYSTEM

CROSS REFERENCE TO RELATED APPLICATIONS

This application is a continuation of U.S. patent application Ser. No. 14/676,669, filed on Apr. 1, 2015, entitled "AUTO-FOCUS IN LOW-PROFILE FOLDED OPTICS MULTI-CAMERA SYSTEM," which is a continuation-in-part of U.S. patent application Ser. No. 14/526,104, filed on Oct. 28, 2014, entitled "AUTO-FOCUS IN LOW-PROFILE FOLDED OPTICS MULTI-CAMERA SYSTEM," which claims the benefit of U.S. Provisional Patent Application No. 61/975,680, filed on Apr. 4, 2014, entitled "METHOD OF AUTO-FOCUSING MULTI-CAMERA SYSTEM USING FOLDED OPTICS," and U.S. Provisional Patent Application No. 62/015,364, filed on Jun. 20, 2014, entitled "METHOD OF AUTO-FOCUSING MULTI-CAMERA SYSTEM USING FOLDED OPTICS." U.S. patent application Ser. No. 14/676,669, filed on Apr. 1, 2015, entitled "AUTO-FOCUS IN LOW-PROFILE FOLDED OPTICS MULTI-CAMERA SYSTEM" also claims the benefit of U.S. Provisional Patent Application No. 61/975,669, filed on Apr. 4, 2014, entitled "EXTENSION OF CAMERA RESOLUTION FOR PERISCOPE LENS DESIGNS." The entire content of each of the above-listed applications is hereby incorporated by reference herein.

TECHNICAL FIELD

The present disclosure relates to imaging systems, and particularly to autofocusing a multi-sensor imaging system having folded optics.

BACKGROUND

Many mobile devices, such as mobile phones and tablet computing devices, include cameras that may be operated by a user to capture still and/or video images. Because such mobile devices are typically designed to be relatively thin, it can be important to design the cameras or imaging systems to be as thin as possible in order to maintain a low-profile mobile device. One of the limiting factors as to how thin a mobile camera, imaging system or device can be constructed is the camera, as traditional mobile device cameras have a number of optical elements (e.g., lens system, autofocus assembly, and image sensor) arranged linearly along the height of the device. Accordingly, the optical stack height including optical elements (e.g. refractive optical components, support structures such as the lens, barrel or optical element spacers), the focal length of the lens system, autofocus mechanisms, and possibly other camera elements limit how thin a mobile device can be constructed. As the device becomes thinner the focal length of the camera may need to be shortened, which may make the image circle diameter decrease. If it is desired to increase the number of image sensor pixels then normally the pixel pitch will need to be made smaller or the camera field of view (FOV) of the scene in the object space will need to be increased. If it is not possible to reduce the pixel pitch then the FOV of the camera may need to be increased. At some point it may not be practical or possible to continue decreasing the focal length by increasing the FOV or decreasing the pixel pitch. Accordingly, it may be desired to have lower profile image capture devices without having to shorten the focal length or decrease the resolution of the image.

SUMMARY

Folded optic image sensor arrays allow for the creation of low-profile image capture devices without having to shorten the focal length. Some folded optic image sensor arrays employ a central mirror or prism with multiple facets to split incoming light comprising the target image of the scene into multiple portions for capture by the sensors in the array, wherein each facet directs a portion of the light from the target image toward a sensor in the array. Each portion of the split light may be passed through a lens assembly and reflected off of a surface positioned directly above or below a sensor, such that each sensor captures a portion of the image. The sensor fields of view can overlap to assist in stitching together the captured portions into a complete image.

Due to the reflection of light off of multiple surfaces toward multiple sensors and the height limitations on the camera, traditional autofocus modules and techniques are not adapted for such folded optic low-profile sensor arrays. The folded optics and other structural features of such sensor arrays can make autofocus mechanisms difficult to implement. Moving an autofocus lens assembly up and down over each sensor, as typically done today for most mobile devices with cameras, would increase the height of the system and may change the incident angle and/or the relative positioning of the optical axes with respect to an orthogonal line of the imaging plane.

As stated above, another problem with autofocus in folded optic array cameras is a small form factor (possibly 4.5 mm or less), where ultra-high resolution across the image height is needed. Satisfying both height constraints and performance requirements is difficult to achieve with wide Field of View (FOV) lenses. The most straightforward way to focus the lens is to lift the entire lens assembly up and down over the sensor, but this may change the position of the optical axis of one camera with respect to the optical axis of each of the other cameras as well as increase the overall height of the system. An alternative approach is needed and is described below.

The aforementioned problems, among others, are addressed by the folded optic array camera autofocus techniques described herein for providing an autofocused image to each sensor. By redirecting light toward each sensor in the array using a primary and secondary surface, and by positioning the lens assemblies used to focus the incoming light between the primary and secondary surfaces, the sensor array may be positioned on a flat substrate parallel to a movable portion of the lens assembly. The longer focal length of such an array camera makes it possible to implement features such as optical zoom and to incorporate more complicated optics that require more space than commonly afforded by the traditional mobile camera, such as adding more optical elements. For example, the use of multiple lenses may increase the focal length of the camera and thus decrease the camera's FOV as done for optical zoom lenses when more resolution is desired and likewise when the FOV is desired to be wider the focal length can be decreased. Further, the use of multiple lenses across the field of view of the system can increase the total effective resolution across the entire field of view of the multi-camera array.

In some embodiments, a lens system design enables lateral motion of a movable portion of a lens assembly within the mechanical tolerances of the folded optic system while maintaining good image performance, for example defined by having acceptable modulation transfer function (MTF) values and a focus range between 20 cm and infinity. The movable portion can be moved in a direction parallel to a plane formed by the image sensor. The lens system can additionally include a stationary portion of the lens assembly. In some embodiments, two or more movable lens assembles can be incorporated to implement Zoom and AF. In some implementations, the stationary portion of the lens assembly can be a field corrector lens placed in close proximity to the image sensor, for example affixed to a glass cover plate positioned over the sensor.

An autofocus assembly using the two-part lens system design described above can implement a guide rail and an actuator in some embodiments. For example, the movable portion of the lens assembly can be coupled to an actuator that moves the movable portion through a range of positions to achieve different focal lengths. In some embodiments, the movable portion can be coupled to the actuator by a guide rail passing along an edge of a secondary sensor prism, the secondary sensor prism positioned below the sensor. By moving the guide rail along the edge of the secondary sensor prism, the autofocus assembly can laterally (e.g., in a direction parallel to the plane formed by the image sensor) move the movable portion of the lens assembly while restriction tilt, roll, pitch, and yaw within the tolerances of the lens design and translational lateral movement away from the optical axis within the tolerances of the lens design.

In some embodiments, an autofocus assembly using a two-part lens system design as described above can be provided for each sensor in a folded optic array.

One innovation includes an imaging system, including at least one camera configured to capture a target image scene. The at least one cameras includes an image sensor comprising an array of sensor elements, a primary light folding surface configured to direct a portion of received light in a first direction, an optical element having a secondary light folding surface, the secondary light folding surface positioned to redirect light received from the primary light folding surface in a second direction, and a lens assembly. The lens assembly includes at least one stationary lens positioned between the secondary light folding surface and the image sensor, the at least one stationary lens having a first surface mechanically coupled to the optical element and a second surface mechanically coupled to the image sensor, and at least one movable lens positioned between the primary light folding surface and the optical element. The at least one camera further includes an actuator configured to move the at least one movable lens to focus light propagating through the lens assembly onto the image sensor.

Various embodiments with one or more additional aspects are contemplated. In some embodiments, the optical element further includes an output surface through which light redirected by the secondary light folding surface in the second direction propagates toward the image sensor, and wherein the at least one stationary lens is connected to the output surface. The imaging system may include a cover glass disposed between the image sensor and the at least one stationary lens. The cover glass may include a first cover glass surface coupled to the output surface of the at least one stationary lens, and a second cover glass surface coupled to the image sensor. The cover glass may include a second cover glass surface coupled to the image sensor. The optical element, at least one stationary lens, cover glass, and image sensor may be mechanically coupled together in a stack.

In some embodiments, the array of sensor elements have a sensor element pitch, wherein the image sensor has a Nyquist sampling rate determined based at least part on the sensor element pitch, and wherein the optical system is configured to have an MTF performance of about 30% or less at the image sensor Nyquist sampling rate. In some embodiments, the sensor element pitch is about 1.4 µm or less. Another aspect is that the at least one camera may further include at least one guide rail coupled between the actuator and the at least one movable lens of the lens assembly, the at least one guide rail positioned to slidably engage a surface within the camera to constrain motion of the at least one movable lens away from an optical axis or rotating around the optical axis, the optical axis being substantially parallel to the first direction. The at least one camera may include a plurality of cameras configured to capture a corresponding plurality of portions of the target image scene, and the imaging system further comprises a processor configured to generate a final image of the target image scene based at least partly on the corresponding plurality of portions. In some embodiments, the sensor element pitch can be approximately 1.0 µm or less. In some embodiments the diameter of the at least one movable lens is 4.5 mm or less.

In some embodiments of the system the at least one stationary lens includes a planoconcave lens having a substantially flat surface disposed parallel to the image sensor and proximate to the optical element, and a concave surface disposed opposite the substantially flat surface and disposed proximate to the image sensor. Another aspect is that the secondary light folding surface may include a mirror. Is some embodiments, the optical element further includes a support structure coupled to the mirror, and wherein the image sensor and the mirror are mechanically coupled together to be stationary relative to each other.

Another innovation is an imaging system, including at least one camera configured to capture a target image scene, the at least one camera including an image sensor comprising an array of sensor elements, a primary light folding surface configured to direct a portion of received light in a first direction, a means for redirecting light configured to redirect light received from the primary light folding surface in a second direction to the image sensor, a lens assembly having at least one stationary lens positioned between the secondary light folding surface and the image sensor, the at least one stationary lens having a first surface mechanically coupled to the means for redirecting light and a second surface mechanically coupled to the image sensor, and at least one movable lens positioned between the primary light folding surface and the optical element. The imaging system can further include means for moving the at least one movable lens to focus light propagating through the lens assembly onto the image sensor. In some embodiments, the means for redirecting light comprises an output surface through which light redirected means for redirecting light in the second direction propagates toward the image sensor, and wherein the at least one stationary lens is connected to the output surface. In some embodiments, the system further comprises means for protecting the image sensor disposed between the image sensor and the at least one stationary lens. The means for protecting the image sensor includes a cover glass. The cover glass may include a first cover glass surface coupled to the output surface of the at least one stationary lens. The cover glass may include a second cover glass surface coupled to the image sensor. In various embodiments, the means for redirecting light, the at least one stationary lens, the cover glass, and image sensor are mechanically coupled together to be stationary relative to each other. In some embodiments, the at least one stationary lens includes a planoconcave lens having a substantially flat surface disposed parallel to the image sensor and proximate to the optical element, and a concave surface disposed opposite the substantially flat surface and disposed proximate to the image sensor.

Another innovation is a method that includes providing at least one camera configured to capture a target image scene, the at least one cameras including an image sensor comprising an array of sensor elements, a primary light folding surface configured to direct a portion of received light in a first direction, an optical element having a secondary light folding surface, the secondary light folding surface positioned to redirect light received from the primary light folding surface in a second direction, and a lens assembly having at least one stationary lens positioned between the secondary light folding surface and the image sensor, the at least one stationary lens having a first surface mechanically coupled to the optical element and a second surface mechanically coupled to the image sensor, and at least one movable lens positioned between the primary light folding surface and the optical element. The at least one camera further having an actuator configured to move the at least one movable lens to focus light propagating through the lens assembly onto the image sensor. The method further including focusing the at least one camera on the target image scene by moving the at least one movable lens while maintaining the relative positioning of the optical element, the at least one stationary lens and the image sensor. The at least one camera may include a plurality of cameras, and the method further includes receiving images from the plurality of cameras and form an image comprising at least a portion of the images received from the plurality of cameras.

Another innovation includes an imaging system having at least one camera configured to capture a target image scene, the at least one cameras including an image sensor comprising an array of sensor elements, wherein the array of sensor elements have a sensor element pitch, wherein the image sensor has a Nyquist sampling rate determined based at least part on the sensor element pitch, an optical element having a secondary light folding surface, the secondary light folding surface positioned to redirect light received on the secondary light folding surface in a second direction, and a lens assembly having at least one stationary lens positioned between the secondary light folding surface and the image sensor, the at least one stationary lens having a first surface mechanically coupled to the optical element and a second surface mechanically coupled to the image sensor, and at least one movable lens positioned such that light received by the secondary folding surface propagates through the at least one movable lens. The imaging system may also include an actuator configured to move the at least one movable lens to focus light propagating through the lens assembly onto the image sensor.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 1A illustrates a cross-sectional side view of an embodiment of a folded optic sensor assembly showing one sensor assembly and an associated autofocus device.

DETAILED DESCRIPTION

Introduction

Figure 1B:
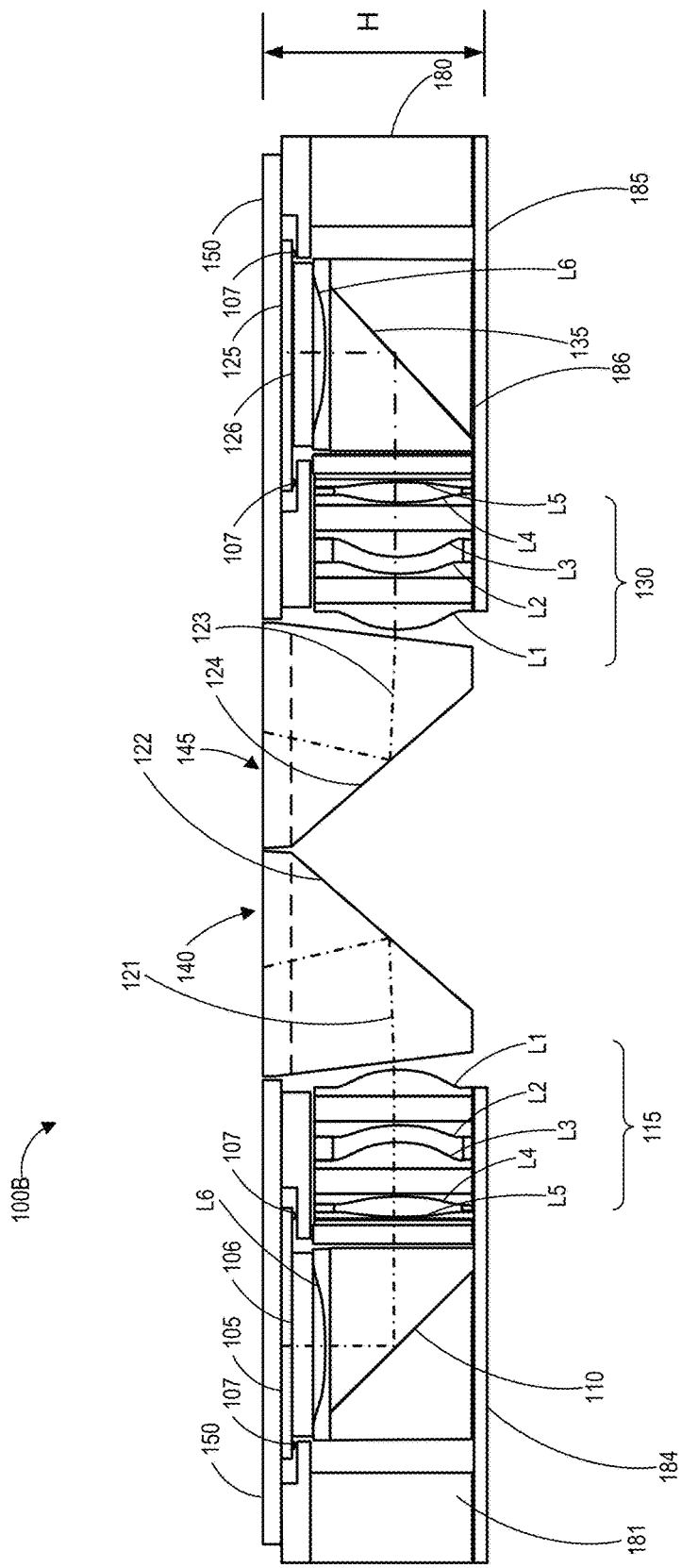
FIG. 1B illustrates a cross-sectional side view of an embodiment of a folded optic sensor assembly showing two sensor assemblies and associated autofocus devices.

Embodiments of the auto-focus systems and techniques for folded optic, multi-camera systems as described herein can include a two-part lens system and an autofocus assembly provided for each image sensor in the multi-camera system. The multi-camera system can include a primary and secondary light folding surface associated with each of a plurality of image sensors. The primary light folding surface can be a reflective mirror or refractive prism, can be mounted to a substrate, and can split incoming light from the target image scene into multiple portions corresponding to the number of image sensors in the multi-camera system. The secondary light folding surface can be a reflective mirror or refractive prism, and can redirect the portion of light from the primary light folding surface toward the image sensor, for example where the image sensor is mounted flat on the same substrate to which the primary light folding surface is mounted.

One important aspect of such an embodiment is that, by redirecting light toward each sensor in the array using one or more reflective surfaces or prisms, it is possible to position all image sensors on a common flat substrate. In some embodiments all sensor surfaces are formed on one common die, where circuitry can be shared between all sensors, possibly reducing the die area, power requirements and interfaces in and outside of the die.

As stated above, the traditional method of moving the lens up or down above the image sensor, for example, along the optical axis of the image sensor, may not be desirable because it may increase the camera module height and potentially create other undesirable characteristics or aspects.

Another potential problem with autofocus in folded optic systems can be the need to achieve high modulation transfer function (MTF) resolution performance across the full field of view (FOV) of the image projected on the image sensor surface. The maximum MTF performance of a lens assembly is bounded by the diffraction limit of the lens assembly, which is determined by the f-number and the wavelengths of light passing through the lens assembly. The lens assembly is made up of one or more optical elements from the first surface of the lens assembly to the last surface of the lens assembly that projects the image onto another surface, such as an image sensor surface. An element can be made of one or more optical surfaces that can, for example, refract light or reflect light.

While the lens assembly actual MTF performance can be less than the diffraction limit across the full range of image heights used, it is desirable to design the lens so that it is possible to fabricate a set of samples or large quantity of lens assemblies that are very close to the diffraction limit of the lens assembly across the full FOV of the lens assembly.

As the MTF performance requirements of a lens assembly increase towards its maximum performance (for example, the diffraction limit), this may place more demands on the tolerances of the mechanical autofocus mechanisms and/or the optical components of the lens assembly, including other aspects of the camera design. Examples of optical components or other camera design aspects that may require tighter tolerances are the autofocus mechanisms, the lens surfaces, lens materials, the alignment of the lens surfaces with respect to one another, and the combined fabrication of the autofocus mechanisms with the lens assembly as a single operating unit. The mechanical autofocus mechanisms can, for example, create lens tilt errors (for example, rotational errors about the optical axis) and/or translational errors (e.g., X, Y and Z linear direction errors about the optical axis). In a design intended for fabrication ranging from just a few samples to large quantities it is generally a good practice to establish limits for all key variations, such as lens tilt and lens translation, and then determine a tolerance budget for all components, elements, or aspects that can create these variations, such as lens tilt or translation, and those components, elements or aspects that can be influenced by those variations. The influence normally is expressed in MTF reduction as one or more key variations change in amount. After determining the tolerance budget for all mechanical and optical components, elements or design aspects, those components, elements or aspects can then be designed so they stay within the budgeted tolerances with a certain level of statistical confidence. The use of such practices can, for example, increase the yield of the final finished product, such as the complete single or multi camera autofocus module. By viewing this system in this way, the lens assembly can be designed to be less sensitive to factors caused by the aforementioned variations or to contribute less to the aforementioned variations.

When auto-focus mechanisms or other similar descriptions or references are used herein, such a reference can include all related linkages, components, elements or aspects associated or not associated with the process of focusing a lens. For example autofocus mechanisms can include one or more motors, one or more actuators, linkages, devices, components, elements, or aspects that may cause or pass motion, where this motion in turn will move or cause action to bring a lens system into a certain level of focus. Other factors may affect the lens assembly MTF without the motor or motion from the motor. The level of the focus can be expressed in various ways such as in terms of MTF, Pulse Spread Function (PSF), or by other suitable measures.

Though discussed herein primarily in the context of MTF performance, this is for illustrative purposes, and lens performance can be expressed in other embodiments by similar concepts such as PSF, Line Spread Function (LSF) or other direct or indirect ways of expressing similar concepts.

The embodiments described herein may be used for folded optics, high MTF resolution auto-focus designs where the lens assembly design and autofocus mechanical structure design can work together to reduce the variations that can cause the MTF resolution to decrease, and/or to reduce the MTF sensitivity of the lens assembly, elements, aspects for the types and magnitude of the variations that may occur. The range of possible variations that can lead to loss or reduction in the MTF performance can come from secondary sources, tertiary sources, or the like, that are affected by the aforementioned possible variations, or others variations and in turn influence or reduce the MTF performance.

One example of a process to design a folded optics system is to start with the image sensor pixel pitch. The lens will need to act as an anti-aliasing filter in the optical domain. If image sensor pixel pitch is not taken into account at the beginning of the lens design process, then the resulting lens design may filter out scene frequency content in cycles per mm at the focus plane, that are below the Nyquist sample rate of the image sensor. Or alternatively, the resulting lens design may allow too much content above Nyquist scene frequency (in cycles per mm) to pass through, in which case the image may have noticeable aliasing artifacts. In some embodiments, the lens system should reduce the MTF to 20% (or slightly less) at the Nyquist sample rate. The diffraction limit can then be used as a starting point for the lens design, where the f-number can be determined that would meet the 20% or slightly less rule. Once the f-number is determined then an amount to increase the diffraction limit can be estimated so that the final lens assembly design will have 20% MTF or less at the Nyquist rate. For example, if the lens MTF is 10% or less than the diffraction limit at or near the Nyquist sample rate, then the f-number potentially could be decreased to help achieve the 20% or slightly less rule.

The more the diffraction limit is increased, the wider the clear aperture will need to be increased, provided the effective focal length remains approximately constant. As the clear aperture increases the height of the lens assembly may increase. In order to keep the folded optics as thin as possible it is accordingly important to design the lens assembly so the MTF performance is as close as possible to the diffraction limit. Otherwise, it may not be possible to meet the module height, or thinness, requirements for the entire single or multi camera autofocus module. Those skilled in the art will recognize the f-number is equal to the effective focal length divided by the clear aperture of the imaging system, such as a camera lens system or assembly.

For the embodiments presented herein, the lens assemblies were designed to remain as close as possible to the diffraction limit across all spatial frequencies, in cycles per mm, up to the Nyquist sample rate and all the higher frequencies, in cycles per mm, out to the diffraction limit vanishing point. In addition, the MTF performance was designed to remain as close as possible to the diffraction limit across the full FOV of the lens assembly, and at all focus distances from infinity to a near distance of 200 mm.

The embodiments presented herein, as examples, are based on using an imaging sensor square pixel array where the pixel pitch is 1.1 µm and the pixel fill factor is 100%. The embodiments described herein therefore are based on the Nyquist sample rate of 454 cycles per mm. A person having ordinary skill in the art about sample theory will recognize that the square aperture width, such as 1.1 µm, may introduce sampling MTF roll-off. This sampling MTF roll-off can be calculated. The diffraction limit can be increased further to compensate for the sampling MTF roll-off so that at the Nyquist sample rate the lens MTF roll-off plus the sampling MTF roll-off will produce a net 20% MTF altogether; or some other slightly less MTF level as the case may be.

It should also be recognized that the embodiments presented herein are not limited to any pixel size, shape, pitch, rectangular array, non-rectangular array, or arrangement where the pixel size or shape can be different from one another on the surface of the image sensor. The embodiments are intended to point out the factors or aspects that may be used to design such a system and the benefits, attributes and claims of the system being described herein. The embodiments are not limited to the pixel size or other factors covered when describing or referring to those embodiments.

The embodiments presented herein can be implemented using a refractive sensor prism or a reflective mirror over the sensor. The refractive sensor prism can use total internal reflection properties to reflect light towards the sensor surface or a reflective surface on the refractive prism shaped optical element.

For the embodiments presented herein the sensor prism reflective surface and also the sensor mirror surface can have the most sensitivity to rotation and translational variations. These variations can come from the operation of the autofocus mechanisms, the motor, and interactions of the motor with other mechanical and/or optical components, elements or aspects as well as other environmental conditions such as motion, temperature, and shock. The rotation and translational variations can come from other related or unrelated sources. Other aspects can also have an impact on the MTF performance.

The embodiments described herein utilize methods intended to reduce the aforementioned variations.

In some examples, the two-part lens system can include a movable portion positioned between the primary and secondary light folding surfaces of the folded optical path of one image sensor. The movable portion of the lens assembly can move laterally (e.g., in a direction parallel to the plane formed by the image sensor) between the primary and secondary light folding surfaces to change the focal depth of an image captured by the sensor. The movable portion may include a number of lenses selected to produce the desired focal length and resolution. The two-part lens system can also include a stationary portion, for example a field corrector lens positioned in close proximity to the sensor. In some embodiments, the field corrector lens may be affixed (e.g., glued or mechanically held in place) to a glass cover plate positioned over the sensor.

In some embodiments, the autofocus assembly used to move the movable portion of the lens system can include an actuator and a guide rail or other guiding device. The actuator may be a voice coil motor (VCM), micro-electronic mechanical system (MEMS), piezoelectric motor, or a shape memory alloy (SMA). The actuator can be coupled to the substrate on the opposite side of the secondary light folding surface from the movable portion of the lens assembly, and can be coupled to the movable portion by the guide rail. The guide rail can translate the actuator motion to the movable portion, and in some embodiments can engage (for example, slidably engage) a surface of the secondary light folding surface in order to constrain tilt (e.g., roll, pitch, yaw, and rotational motion) and lateral translation movements of the movable portion within the tolerances of the lens design.

Various embodiments will be described below in conjunction with the drawings for purposes of illustration. It should be appreciated that many other implementations of the disclosed concepts are possible, and various advantages can be achieved with the disclosed implementations.

Overview of Autofocus Assembly

Referring now to FIGS. 1A and 1B, one example of an embodiment of an autofocus system for a folded optic multi-sensor assembly 100A, 100B will now be described in greater detail. FIG. 1A illustrates a cross-sectional side view of an embodiment of a folded optic sensor assembly with autofocus capabilities 100A showing one sensor assembly and an associated autofocus device. FIG. 1B illustrates a cross-sectional side view of an embodiment of a folded optic sensor assembly with autofocus capabilities 100B showing two sensor assemblies and associated autofocus devices As shown in the example of FIG. 1A, an image sensor 125 is positioned on a substrate 150. The substrate 150 is adjacent, at one edge shown in the cross-section, to an optical element configured to re-direct light incoming light, and that includes a primary light folding surface 124. As illustrated, the primary light folding surface 124 is part of a refractive prism 145. As illustrated, sensor 125 is mounted within a rectangular slot 117 formed in the printed circuit board 195. Stud bumps 107 are connected to, for example, one part of the sensor 125 and are used to make contact with electrically conducting pads on the printed circuit board 195. The printed circuit board 195 may be mounted on substrate 150 and remains stationary relative to the substrate 150. This is just one example of how the sensor 125 can be mounted to the substrate 150 and make electrical contact with a printed circuit board like 195. In some embodiments the sensor 125 can be affixed to substrate 150 using an adhesive. In some embodiments, sensor 125 may be formed as part of substrate 150, for example substrate 150 may be a silicon die or other semiconductor material suitable for forming sensor 125 in a portion thereof. As illustrated, the sensor 125 is covered by cover glass 126, and lens L6 is positioned on the other side of the cover glass 126 from the sensor 125. In some examples the cover glass 126 includes two or more components coupled together. In some examples, the cover glass 126 is coupled to the sensor 125 during manufacturing in order to prevent contamination of a light receiving surface of the sensor. However, in some embodiments the cover glass 126 may be omitted and the lens L6 may be coupled directly to the sensor 125.

The lens L6 can be a field corrector lens. In some embodiments, lens L6 is a stationary component of the L1-L6 lens system. In some embodiments the lens L6 can include multiple lens elements forming a lens group, which is stationary (a "stationary lens group"), that is, does not move to perform an autofocus operation. L6 may be one lens or multiple lenses forming a the stationary lens group, where each lens is connected together as a group or stack of lens. The secondary light folding surface 135 extends away from the lens L6, and as illustrated is formed as a refractive prism 136A coupled to a support block 136B at the secondary light folding surface 135. It is possible that a mirror surface be placed between the 136A and 136B instead of using the internal reflective characteristics of a prism to redirect the light.

A movable portion 130 of the lens system including lenses L1, L2, L3, L4, and L5 is positioned between the primary light folding surface 124 and the secondary light folding surface 135. Optical axis 123 shows one example of a path that light could take as it enters the array camera 100A, is redirected off of the primary light folding surface 124, passes through the movable portion 130 of the lens system, is redirected off of the secondary light folding surface 135, passes through the lens L6 and the cover glass 126, and is incident upon the sensor 125. The movable portion 130 can move laterally (e.g., along the optical axis 123 that extends from the primary light folding surface 124 and the secondary light folding surface 135 and in a direction substantially parallel to the plane formed by the sensor 125) between a bounding edge 141 of the refractive prism 145 forming the primary light folding surface 124 and a bounding edge 131 of the refractive prism 136A forming the secondary light folding surface 135 in order to change the focus distance in the object space. The lens L6 may be positioned in a plane parallel to, or substantially parallel to, an optical axis of the movable portion 130.

In some embodiments, the sensor 125, cover glass 126, lens L6, and the unit including the refractive prism 136A and/or block 136B (referred to herein as an "optical element") may be adhered or otherwise affixed in the illustrated configuration such that these components are fixed together relative to one another within the camera. In some embodiments these components may be permanently, or semi-permanently fixed together such that their positions with respect to one another stay the same, which stabilizes the optical path of light through the elements. In some embodiments, as discussed above, cover glass 126 may be omitted and the remaining sensor 125, lens L6, and the refractive prism 136A and/or block 136B can be adhered or otherwise affixed to one another with the lens L6 positioned between the sensor 125 and the refractive prism 136A and/or block 136B. For example, lens L6 may be disposed physically between a portion of sensor 125 and refractive prism 136A and/or block 136B. Also for example, lens L6 may be disposed in the optical path of light propagating from block 136B to the sensor 125. As illustrated, the optical element comprises an input surface (bounding edge 131) for receiving the light passed from the primary light folding surface 124 through the movable portion of the lens assembly 130, the secondary light folding surface 135, an output surface (adjacent to the lens L6), and a guide surface 186.

As used herein, the term "camera" refers to an image sensor, lens system, and a number of corresponding light folding (or reflecting) surfaces, for example the primary light folding surface 124, movable lens assembly 130, secondary light folding surface 135, stationary lens L6, and sensor 125 as illustrated in FIG. 1A. A folded-optic multi-sensor array can include a plurality of such cameras in various configurations. For example, embodiments of array camera configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the autofocus systems and methods described herein are possible.

Actuator 180 can be used to laterally move the movable portion 130. The actuator 180 may be a VCM, MEMS, piezoelectric motor, or SMA. The actuator 180 can be coupled to the movable portion 130 by guide rail 185 extending along a lower edge 186 of the refractive prism 136A and/or block 136B. The guide rail 185 can translate motion from the actuator 180 to the movable portion 130. The guide rail 185 can slidably engage lower edge 186 (or another surface within the camera, for example another surface of the refractive prism 136A and/or block 136B, an adjacent surface of a camera housing, a lower surface of the central refractive prism, a pad or block coupled to the optical element, and the like) in order to constrain tilt, roll, pitch, yaw, and translational linear motions of the movable portion 130 (that is, motion away from or twisting around the optical axis of the movable portion 130) within the tolerances of the lens design (e.g., while still providing image of a desired quality). Although only one guide rail 185 is illustrated, some examples may include a number of guide rails 185 as needed for constraining the motion of the movable portion 130 of the lens assembly. Friction between the guide rail 185 and the lower edge 186, as well as any friction between the movable lens system 130 and surrounding components, may be reduced by any suitable means, for example ball bearings, lubricating liquids or solids, magnetic fields, or a combination thereof. In some embodiments, magnetic coils wrapped around the movable portion 130 and/or the actuator 180 can further minimize unwanted movement in the tilt, roll, pitch, yaw, and translational linear directions.

Although the guide rail 185 is primarily discussed herein as slidably engaging the lower edge 186 of a prism 136A and/or block 136B forming the secondary light folding surface 135, the guide rail 185 may slidably engage other surfaces in other embodiments. For example, an end of the guide rail may extend past the movable portion of the lens system and slidably engage a lower surface of the prism 145 forming the primary light folding surface 124. In some embodiments, the camera may include one or more light folding surfaces as reflective mirrors. In such embodiments, the guide rail may contact an edge of one or more of the mirrors and/or mounting blocks for the mirrors in order to constrain the unwanted rotational and/or translational motion about the optical axis of the movable portion of the lens assembly.

Although discussed primarily within the context of multi-camera folded optic array systems such as are described herein, the autofocus assembly can be used in any folded optic system with one or more image sensors or folded optics lens assemblies.

As shown in FIG. 1B, a sensor assembly 100B includes a pair of image sensors 105, 125 each mounted to substrate 150, movable lens assemblies 115, 130 corresponding to image sensors 105, 125, respectively, and stationary lenses L6 positioned over the cover glass 106, 126 of image sensors 105, 125, respectively (that is, the cover glass 106, 126 are positioned between the stationary lenses L6 and the image sensors 105, 125). Each movable lens assembly 115, 130 is coupled to a guide rail 184, 185, which is in turn coupled to an actuator 181, 180. The primary light folding surface 122 of refractive prism 140 directs a portion of light from the target image scene along optical axis 121 through the movable portion 115 of the lens system, is redirected off of the secondary light folding surface 110, passes through the lens L6 and the cover glass 106, and is incident upon the sensor 105. The primary light folding surface 124 of refractive prism 145 directs a portion of light from the target image scene along optical axis 123 through the movable portion 130 of the lens system, light is redirected off of the secondary light folding surface 135, passes through the lens L6 and the cover glass 126, and is incident upon the sensor 125.

The image sensors 105, 125 may comprise, in certain embodiments, a charge-coupled device (CCD), complementary metal oxide semiconductor sensor (CMOS), or any other image sensing device that receives light and generates image data in response to the received image. Image sensors 105, 125 may be able to obtain image data of still photographs and may also provide information regarding motion in a captured video stream. Sensors 105 and 125 may be individual sensors or may represent arrays of sensors, such as a 3×1 array. Any suitable array of sensors may be used in the disclosed implementations.

The sensors 105, 125 may be mounted on the substrate 150 as shown in FIG. 1B, for example, in a plane that is parallel (or nearly so) to the movement of the lens assembly 115, 130 and the optical axis of the lens assembly 130. In some embodiments, all sensors may be on one plane by being mounted to the flat substrate 150. For example, in various embodiments, two, three, four, five, six, seven or eight, or more, sensors may be disposed in a plane and mounted on or coupled to the substrate 150. Substrate 150 may be any suitable substantially flat material. The substrate 150 can include an opening to allow incoming light to pass through the substrate 150 to the primary light folding surfaces 122, 124. Multiple configurations are possible for mounting a sensor array or arrays, as well as the other camera components illustrated, to the substrate 150.

Primary light folding surfaces 122, 124 may be prism surfaces as illustrated, or may be a mirror or a plurality of mirrors, and may be flat or shaped as needed to properly redirect incoming light to the image sensors 105, 125. In some embodiments the primary light folding surfaces 122, 124 may be formed as a central mirror, pyramid, or prism, or other shapes that employ separate sections or facets to separate portions of the image scene in the object field whether overlapping or not overlapping. The central mirror, pyramid, prism, or other reflective surface may split light representing the target image into multiple portions and direct each portion at a different sensor. For example, a primary light folding surface 122 may send a portion of the light corresponding to a first field of view toward the left sensor 105 while primary light folding surface 124 sends a second portion of the light corresponding to a second field of view toward the right sensor 125. In some embodiments in which the receiving sensors are each an array of a plurality of sensors, the light folding surfaces may be made of multiple reflective surfaces angled relative to one another in order to send a different portion of the target image scene toward each of the sensors. It should be appreciated that together the fields of view of the cameras cover at least the target image. The fields of view can be aligned and stitched together after capture to form a final image, for example, as further described below referring to image stitching module 240 and a processor illustrated in FIG. 2.

The light folding surfaces can be flat or curved in various embodiments. A light folding surface can have a curvature that is part of the optical system, whereby it alters the path of the light in a manner other than that of a flat surface. For example such a curved surface could be part of the overall lens optical design, where without using such a curved surface, the performance of the lens design and/or the focusing capability would not be achieved. The light folding surface can also have other materials or optical elements that alter light in the optical path. The other optical elements can include, but are not limited to, Diffractive Optical Elements (DOE), coatings, polarizing elements, etc.

Each sensor in the array (and each camera) may have a substantially different field of view, and in some embodiments the fields of view may overlap. Certain embodiments of the light folding surfaces may have complicated non-planar surfaces to increase the degrees of freedom when designing the lens system.

After being reflected off the primary light folding surfaces 122, 124, the light may be passed through movable lens systems 115, 130 provided between the primary light folding surfaces 122, 124 and reflective surfaces 110, 135. The movable lens systems 115, 130 may be used to focus the portion of the target image which is directed toward each sensor. The autofocus assembly for the movable lens systems 115, 130 can include an actuator for moving the lens among a plurality of different lens positions. The actuator may be a voice coil motor (VCM), micro-electronic mechanical system (MEMS), or a shape memory alloy (SMA). The autofocus assembly may further include a lens driver for controlling the actuator. As depicted, sensor 105 may be positioned above light folding surface 110 and sensor 125 may be positioned above light folding surface 135 ("above" direction referring to the orientation of the embodiment illustrated in FIG. 1B). However, in other embodiments, the sensors may be beneath the secondary reflected surfaces. As used here, an opening in the camera housing through which light representing the target image scene enters is considered as the "top" and accordingly a sensor placed "beneath" a secondary reflective surface would be on a surface of the camera housing opposite the opening. However, in use the camera housing may be positioned in any orientation based, for example, on relation of the camera to a scene of interest for image capture. Other suitable configurations of the light folding surfaces and the sensors are possible in which the light from each lens assembly is redirected toward the sensors.

Each sensor's field of view may be projected into the object space, and each sensor may capture a partial image comprising a portion of the target scene according to that sensor's field of view. In some embodiments, the fields of view for the opposing sensor arrays 105, 125 may overlap by a certain amount. To form a single image, a stitching process as described below may be used to combine the images from the two opposing sensors 105, 125. Certain embodiments of the stitching process may employ the overlap for identifying common features in stitching the partial images together. After stitching the overlapping images together, the stitched image may be cropped to a desired aspect ratio, for example 4:3 or 1:1, to form the final image.

As illustrated by FIGS. 1A and 1B, each camera has a total height H. In some embodiments, the total height H can be approximately 4.5 mm or less. In other embodiments, the total height H can be approximately 4.0 mm or less. Accordingly, a height of the movable lens systems 115, 130 also does not exceed the height H. In other implementations the height may be greater than 4.5 mm.

Figure 1C:
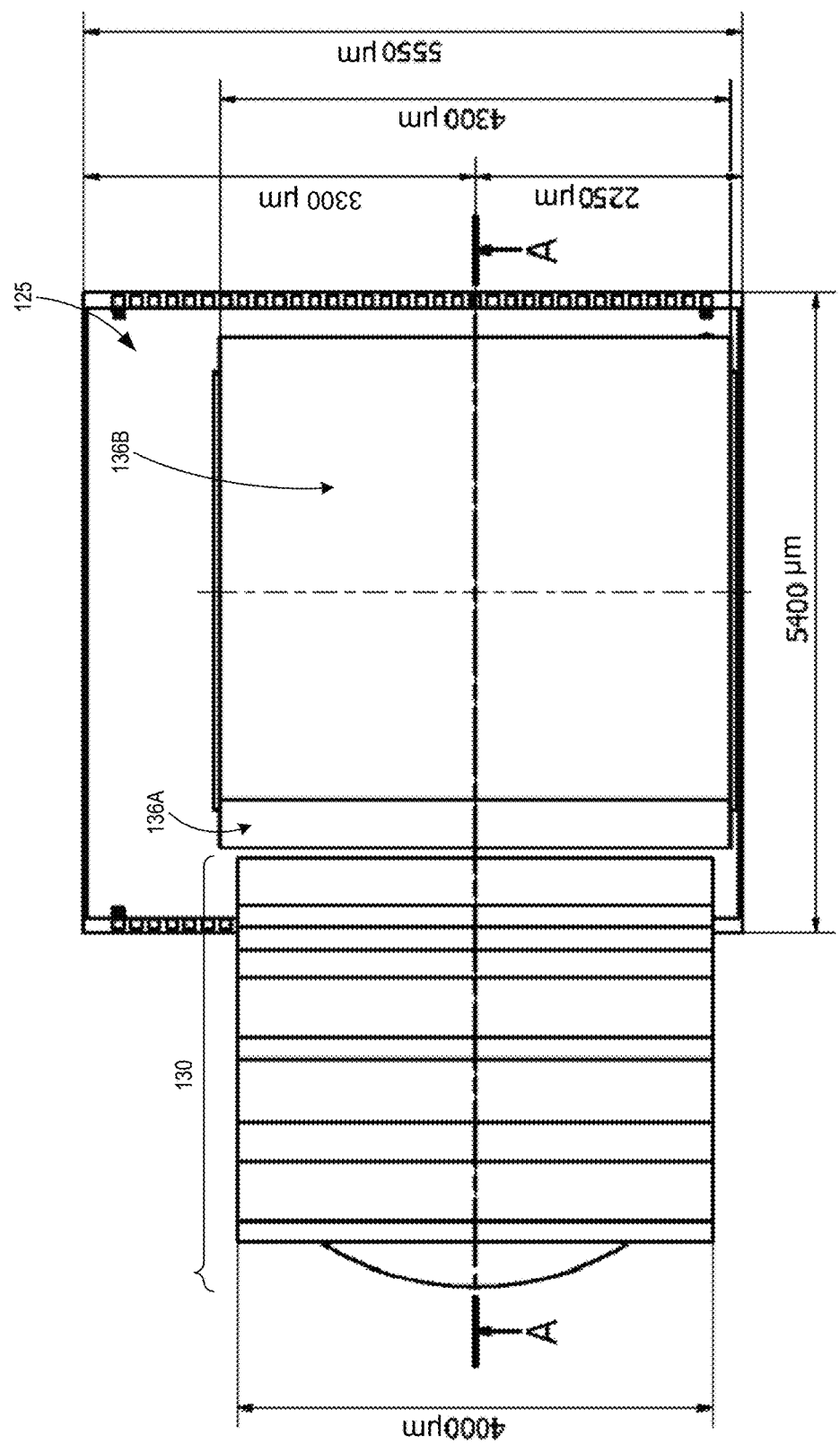
FIG. 1C illustrates a top view of an embodiment of the optical components of the sensor assembly of FIG. 1B.
Figure 1D:
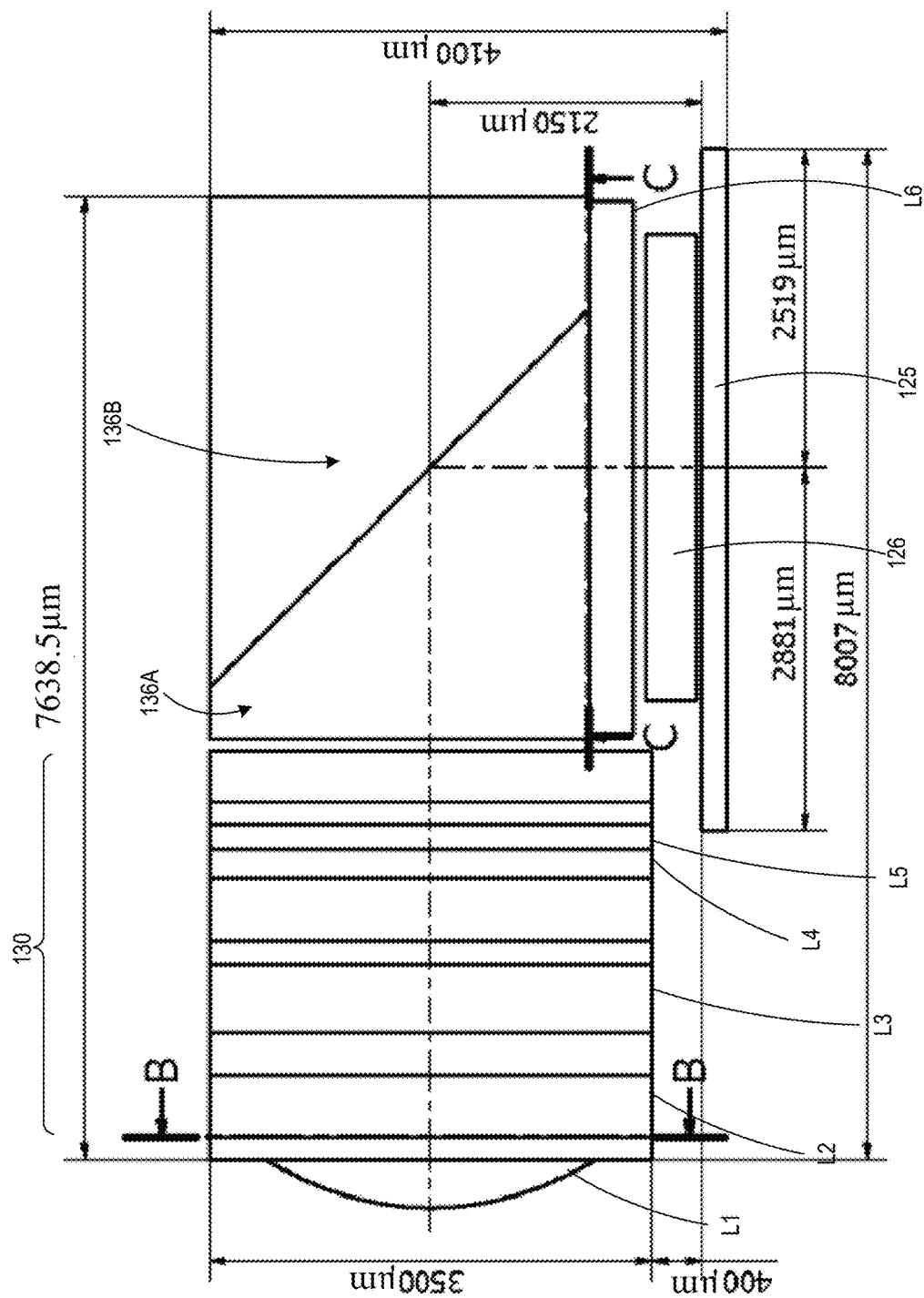
FIG. 1D illustrates a side view of the embodiment of the optical components of FIG. 1C.
Figure 1E:
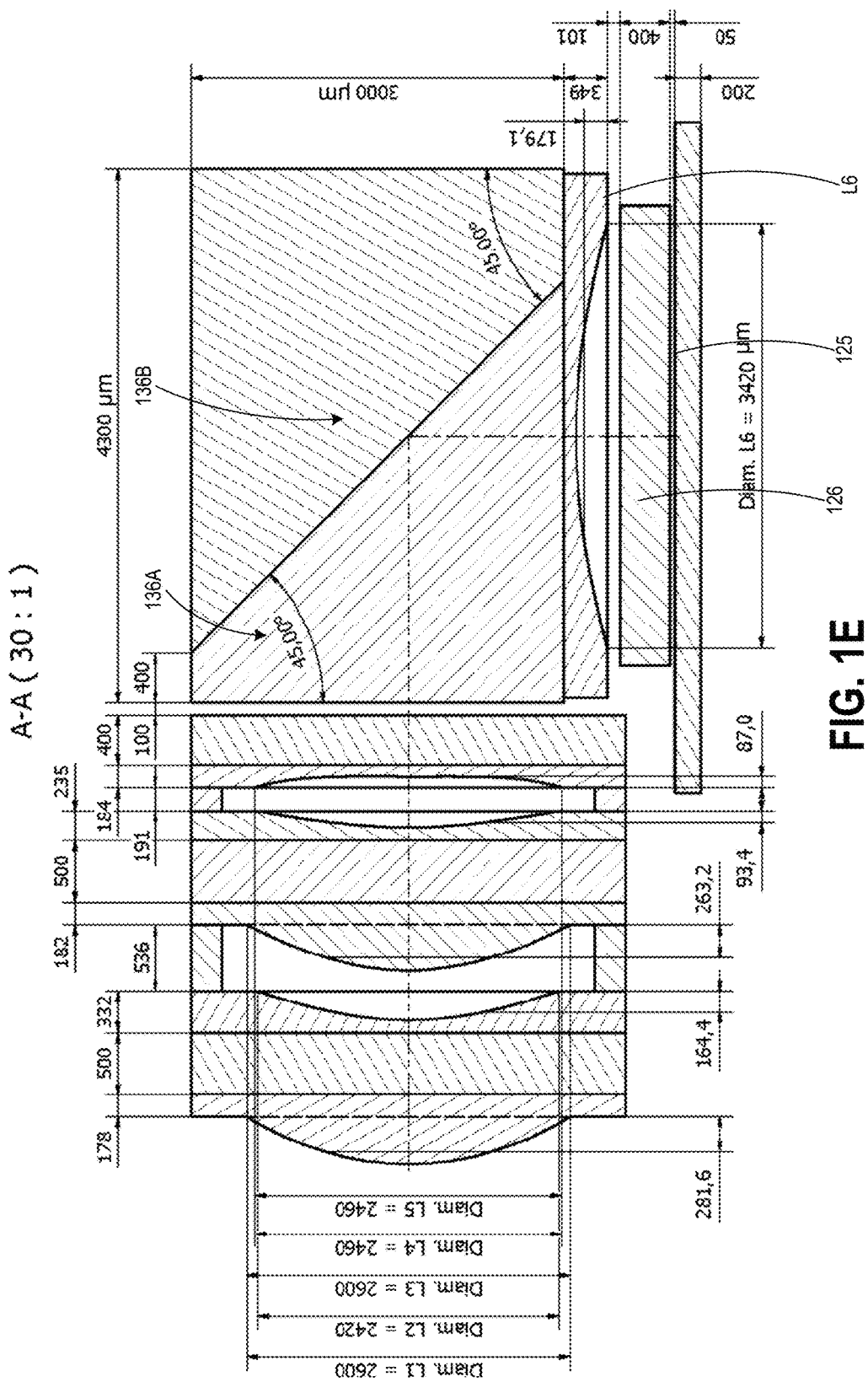
FIG. 1E illustrates a cross-sectional view of the embodiment of the optical components of FIG. 1D.
Figure 1G:
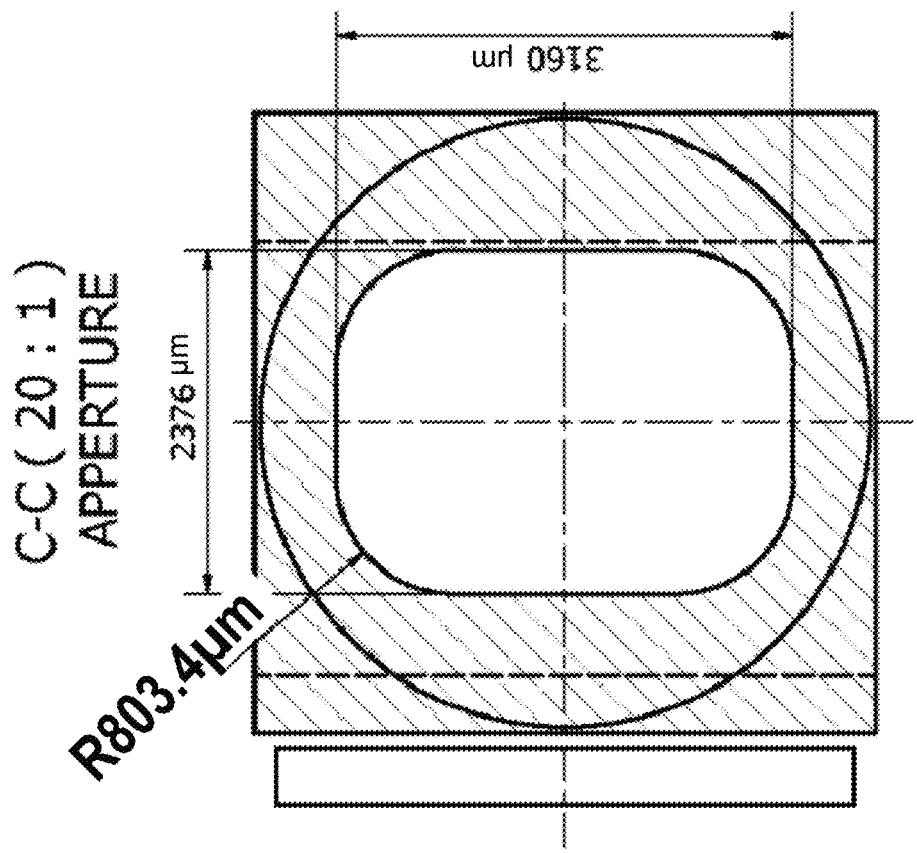
FIG. 1G illustrates a cross-sectional view of an example diaphragm for the embodiment of the optical components of FIG. 1C.
Figure 1F:
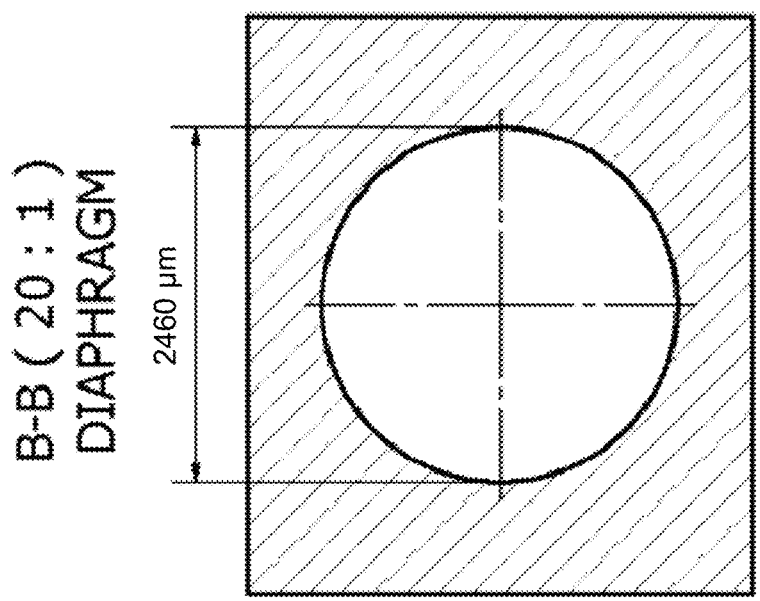
FIG. 1F illustrates a cross-sectional view of an example diaphragm for the embodiment of the optical components of FIG. 1C.

FIGS. 1C-1G illustrate various views of an embodiment of the optical components (including lenses L1-L6, sensor 125, cover glass 126, prism 136A, and block 136B) of the sensor assembly of FIG. 1B together with dimension data, with dimension values for the components provided in micrometers (some dimensions are labeled μm to indicate micrometers, others are not labeled with the "μm" indicia due to space limitations on the figure). FIG. 1C illustrates a top plan view of an embodiment of the optical components of the sensor assembly of FIG. 1B. FIG. 1D illustrates a side view of the embodiment of the optical components of FIG. 1C. FIG. 1E illustrates a cross-sectional view of the embodiment of the optical components of FIG. 1C along the A-A cross section noted in FIG. 1C. FIG. 1F illustrates a cross-sectional view of an example diaphragm for the embodiment of the optical components of FIG. 1C along the B-B cross section noted in FIG. 1D. FIG. 1G illustrates an example of an embodiment of a cross-sectional view of a diaphragm for the embodiment of the optical components of FIG. 1C along the C-C cross section noted in FIG. 1D. In the embodiment illustrated in Figure G, the radius may be 803.4 μm. The dimensions shown in FIGS. 1C-1G are provided to illustrate one possible set of design parameters for the optical components. It will be appreciated that other design parameters can be suitable in other implementations. Using the illustrated parameters or other variations, a person having ordinary skill in the art will appreciate that a variety of known materials can be used to create the lenses based on design factors such as cost, quality, and the like.

Using the illustrated parameters or other variations, a person having ordinary skill in the art will appreciate that there can be more or less lens surfaces and or lens than that shown for lenses L1, L2, L3, L4, L5 and L6. For example, L6 is shown in FIG. 1A to be one lens having one lens surfaces on the side nearest the sensor 125. Instead L6 can have two lens surfaces, wherein there is a lens surface nearest the surface 135, as shown in FIG. 1A, and a lens surface nearest the sensor 125, as shown in FIG. 1A. The surfaces of L6 or any of the lenses used in the camera system may be comprised of having complex lens surfaces such as aspheric surfaces or non-spherical shapes, wherein non-spherical means the shape is not symmetrical about a the optical axis of a the camera system and or any of a the optical component in the camera system. Additionally L6 may comprise more than one lens forming a lens stack of lenses. For example, L6 may comprise two or more lenses forming a lens stack, where each lens has at least one lens surface. Further, L6 may have one lens nearest the surface 135, as shown in FIG. 1A and another lens nearest the sensor 125, as shown in FIG. 1A, forming a stack of lenses made of two or more lenses; wherein there may be one of more lens surfaces between two or more lenses in the stack of lenses of L6.

Overview of Example Image Capture System

Figure 2:
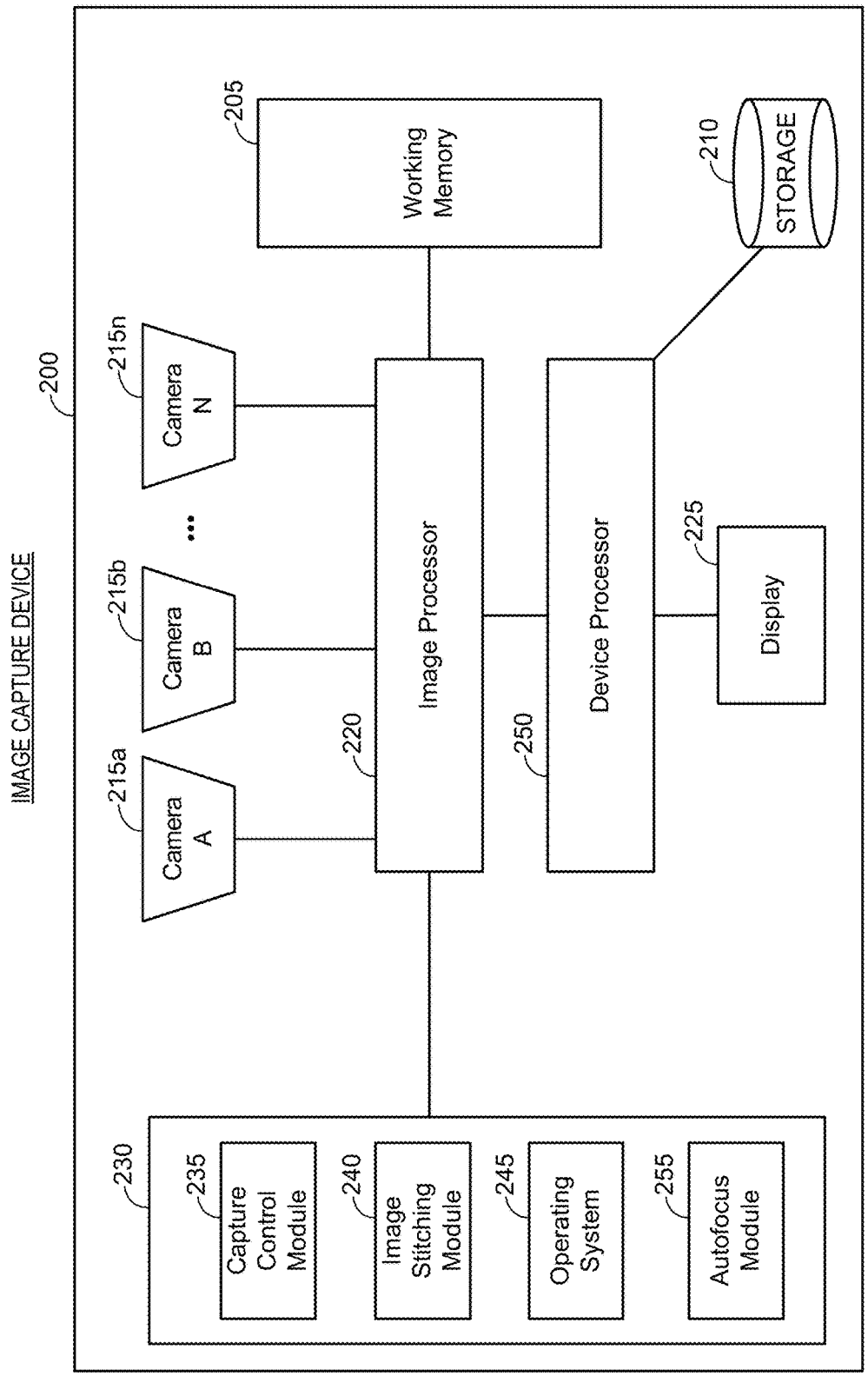
FIG. 2 illustrates a block diagram of one embodiment of an image capture device.

FIG. 2 depicts a high-level block diagram of one possible embodiment of a device 200 having a set of components including an image processor 220 linked to a plurality of cameras 215a-215n. The image processor 220 is also in communication with a working memory 205, memory 230, and device processor 250, which in turn is in communication with electronic storage module 210 and an electronic display 225. In some embodiments, a single processor may be used instead of two separate processors as illustrated in FIG. 2. Some embodiments may include three or more processors.

Device 200 may be, or may be part of, a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-215n for capturing external images. As described above, each camera may include a sensor, lens system, autofocus assembly, and light folding surfaces. The cameras 215a-215n may each include a sensor, lens assembly, and a primary and secondary reflective or refractive surface for redirecting a portion of a target image to each sensor, as discussed above with respect to FIG. 1A. In general, N cameras 215a-215n may be used, where N≥2. Thus, the target image may be split into N portions in which each sensor of the N sensor assemblies captures one portion of the target image according to that sensor's field of view. However, some embodiments may employ only one image sensor assembly, and it will be understood that cameras 215a-215n may comprise any number of image sensor assemblies suitable for an implementation of the folded optic imaging device described herein. The number of cameras may be increased to achieve lower z-heights of the system, as discussed in more detail below with respect to FIG. 4, or to meet the needs of other purposes, such as having overlapping fields of view similar to that of a plenoptics camera, which may enable the ability to adjust the focus of the image after post-processing. Other embodiments may have a field of view overlap configuration suitable for high dynamic range cameras enabling the ability to capture two simultaneous images and then merge them together. The cameras 215a-215n may be coupled to the camera processor 220 to transmit captured image to the image processor 220.

The image processor 220 may be configured to perform various processing operations on received image data comprising N portions of the target image in order to output a high quality stitched image, as will be described in more detail below. Processor 220 may be a general purpose processing unit or a processor specially designed for imaging applications. Examples of image processing operations include cropping, scaling (for example, to a different resolution), image stitching, image format conversion, color interpolation, color processing, image filtering (for example, spatial image filtering), lens artifact or defect correction, lens light roll-off or reduction of light level caused by vignetting, and the like. Processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, operating system 245, and autofocus module 255. These modules include instructions that configure the image processor 220 of device 200 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200.

As mentioned above, the image processor 220 may be configured by several modules stored in the memory 230. The capture control module 235 may include instructions that control the overall image capture functions of the device 200. For example, capture control module 235 may include instructions that call subroutines to configure the image processor 220 to capture raw image data of a target image scene using the cameras 215a-215n. Capture control module 235 may then call the image stitching module 240 to perform a stitching technique on the N partial images captured by the cameras 215a-215n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching, cropping techniques and other image processing techniques on captured image data. For example, each of the N cameras 215a-215n may capture a partial image comprising a portion of the target image according to each sensor's field of view. The fields of view may share areas of overlap, as described above. In order to output a single target image, image stitching module 240 may configure the image processor 220 to combine the multiple N partial images to produce a high-resolution target image. Target image generation may occur through known image stitching techniques.

For instance, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the electronic storage module 210.

Operating system module 245 configures the image processor 220 to manage the working memory 205 and the processing resources of device 200. For example, operating system module 245 may include device drivers to manage hardware resources such as the cameras 215a-215n. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 220 to share information with device processor 250.

Autofocus module 255 can include instructions that configure the image processor 220 to adjust the focus position of each of cameras 215a-215n, for example by controlling the movement and positioning of corresponding autofocus assemblies. Autofocus module 255 can include instructions that configure the image processor 220 to perform focus analyses and automatically determine focus parameters in some embodiments, and can include instructions that configure the image processor 220 to respond to user-input focus commands in some embodiments. In some embodiments, the lens system of each camera in the array can be focused separately. In some embodiments, the lens system of each camera in the array can be focused as a group.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may include a panel display, for example, a LCD screen, LED screen, or other display technologies, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates a number of memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220.

Overview of Example Image Capture Process

Figure 3:
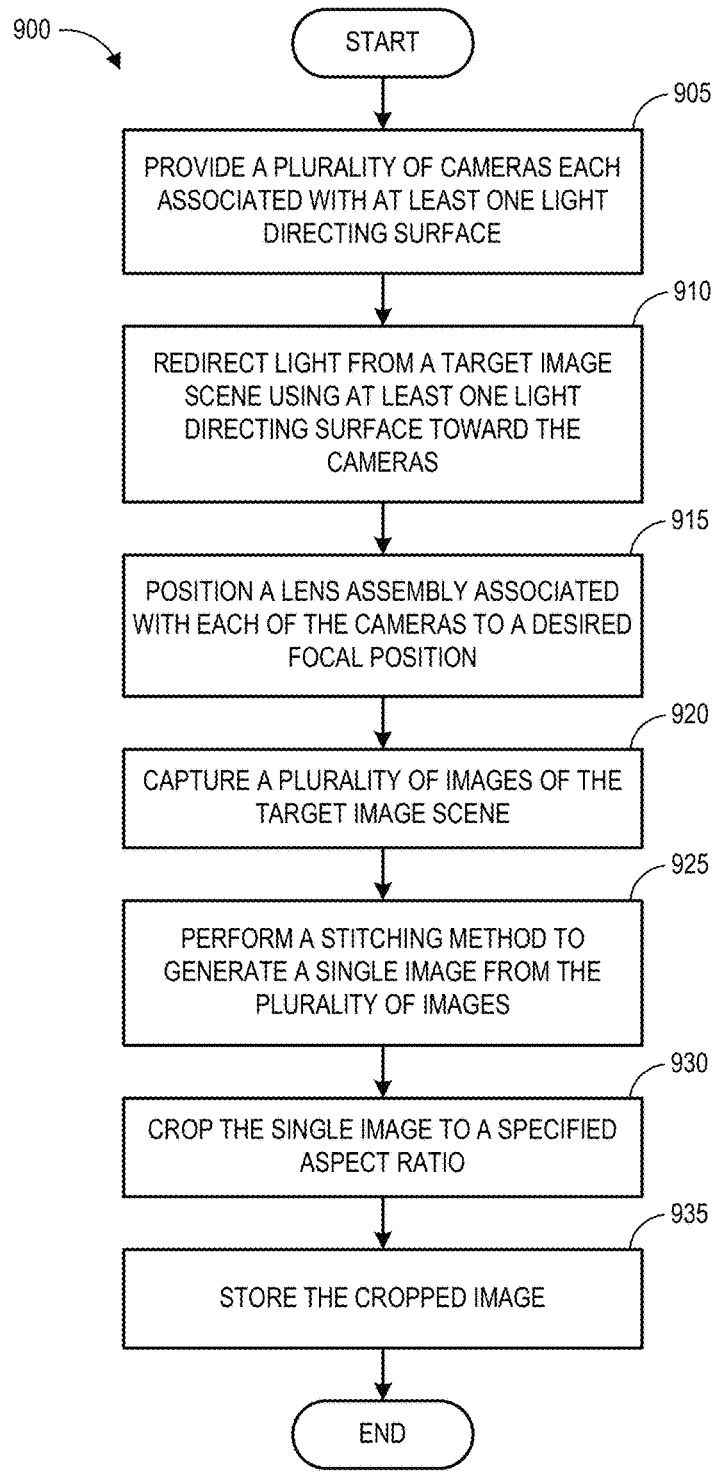
FIG. 3 illustrates an embodiment of a folded optic image capture process with autofocus.

FIG. 3 illustrates an embodiment of a folded optic image capture process 900. The process 900 begins at block 905, in which a plurality of cameras are provided, each having at least one light folding surface and an autofocus assembly. The cameras can form any of the sensor array configurations discussed herein. The cameras may include, as discussed above, a sensor, lens system, and a reflective surface positioned to redirect light from the lens system onto the sensor.

The process 900 then moves to block 910, in which the optical path of the plurality of cameras causes light comprising a target image of a scene to be redirected off at least one light folding surface toward the corresponding imaging sensors. For example, a portion of the light may be redirected off of each of a plurality of surfaces toward each of the plurality of sensors. This step may further comprise passing the light through a lens system associated with each sensor, and may also include redirecting the light off of a second surface onto the sensor.

The process 900 then transitions to block 915, in which a lens assembly associated with each of the cameras is moved to such a position that an image is focused on the sensor, that is, is "focused" or "autofocused" to a desired focal position. For example, this can be accomplished using the actuator and guide rail discussed above in some embodiments. In some embodiments, the autofocus module 255 of FIG. 2 can perform the lens focusing.

The process 900 may then move to block 920, in which the sensors capture a plurality of images of the target image scene. For example, each sensor may capture an image of a portion of the scene corresponding to that sensor's field of view. Together, the fields of view of the plurality of sensors cover at least the target image in the object space.

The process 900 then may transition to block 925 in which an image stitching method is performed to generate a single image from the plurality of images. In some embodiments, the image stitching module 240 of FIG. 2 may perform this block. This may include known image stitching techniques. Further, any areas of overlap in the fields of view may generate overlap in the plurality of images, which may be used in aligning the images in the stitching process. For example, block 925 may further include identifying common features in the overlapping area of adjacent images and using the common features to align the images.

Next, the process 900 transitions to block 930 in which the stitched image is cropped to a specified aspect ratio, for example 4:3 or 1:1. Finally, the process ends after storing the cropped image at block 935. For example, the image may be stored in storage component 210 of FIG. 2, or may be stored in working memory 205 of FIG. 2 for display as a preview or review image of the target scene.

Overview of Example Array Camera Autofocus Assemblies

Figure 4:
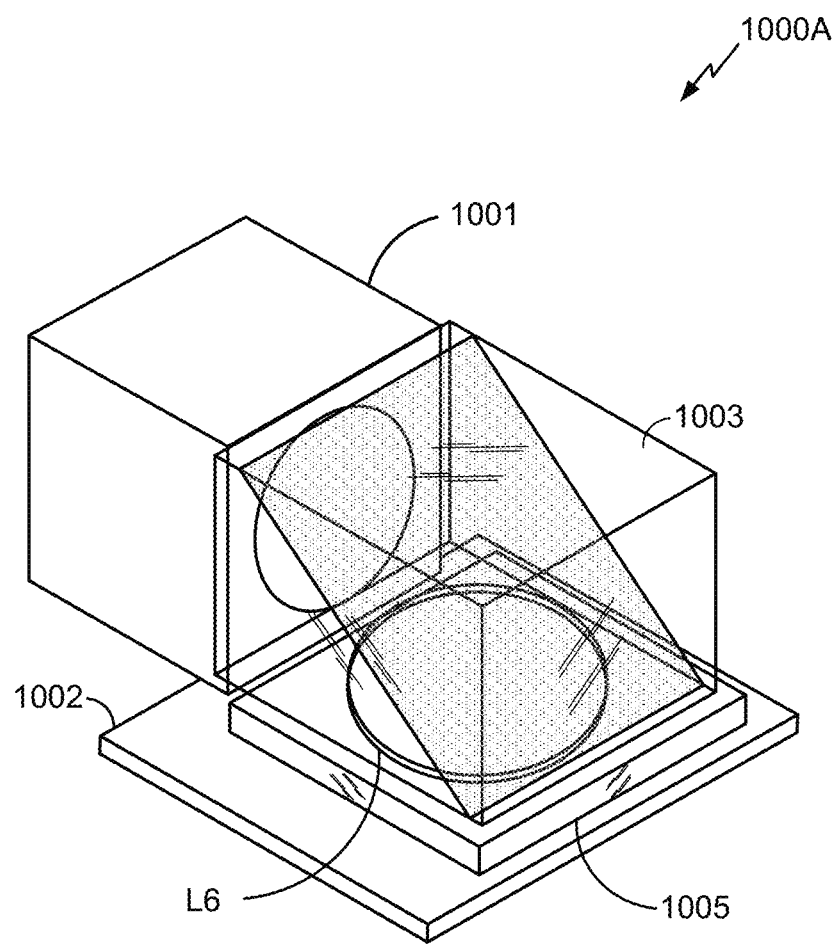
FIG. 4 illustrates a perspective view of an embodiment of a folded optic sensor assembly.

FIG. 4 shows an array camera assembly 1000A according to an embodiment. Camera assembly 1000A comprises lens surfaces L1-L5 implemented in 1001, sensor die 1002, sensor prism 1003, lens surface L6, and sensor cover glass 1005. Sensor prism 1003 can include a mirror surface between two halves or portions of a glass cube in some embodiments.

Figure 5:
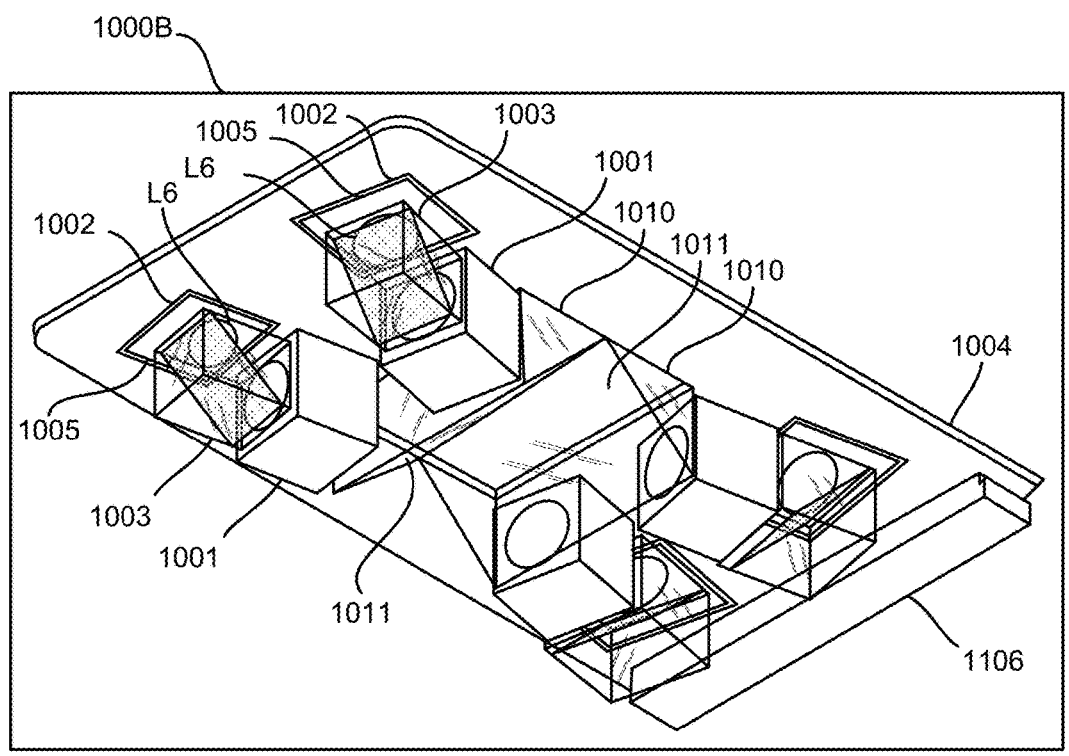
FIG. 5 illustrates a perspective view of an imaging system using multiple sensor assemblies.

FIG. 5 shows an array camera 1000B using multiple camera assemblies installed on a common substrate 1104 according to an embodiment. The array camera 1000B includes a plurality of individual camera assemblies, similar to the assembly 1000A shown in FIG. 4, each comprising lens surfaces L1-L5 implemented in 1001, sensor die 1002, sensor prism 1003, lens surface L6, sensor cover glass 1005, and an electrical connector 1006 that may connect to another part or parts of an overall camera system, such as that described for FIG. 2 and FIG. 3. For clarity, these components have only been labeled on two of the individual camera assemblies. In this example, four camera assemblies 1000A are utilized. More cameras or fewer cameras (or one camera) can also be used. In this example, substrate 1004 can provide rectangular slots where the four image sensor dies 1002 are placed and connected to electrical conducting traces that may be also part of the substrate 1004. In some embodiments the sensor die 1002 may be placed directly on the substrate 1004 and connected to electrical conducting traces without utilizing slots. In other embodiments there are a variety ways for mounting image sensor dies to a substrate that may connect to electrical conducting traces, those skilled in the art may be familiar with other such methods. Electrical connector 1106 is used to connect the electrical devices on subtracted 1004 to the camera image processing system (not shown in this Figure).

In some embodiments, one or more image sensors arrays may be on a common die such as that shown in FIG. 8 of U.S. Application Pub. No. 2014/0111650, filed Mar. 15, 2013 and titled "MULTI-CAMERA SYSTEM USING FOLDED OPTICS," incorporated by reference above. This figure shows an example of two image sensor image surfaces on one common die 811. In this example the object prisms 820 and 821 are positioned on the outside as opposed to the center as shown in FIG. 1B. The image sensor prism or mirror 830 and 831 are shown in the center. The lens assembly of one lens is symbolized by the lens drawing 840, and likewise for a lens assembly symbolized by the lens drawing 841. The optical axes 860 and 861 are shown pointing at two separate locations on the die 811. The die can contain multiple image sensor array areas or a common image sensor array area that captures the image within the field of view of both lens assemblies 840 and 841. The concept associated with this figure can be extended to a plurality of cameras. Those skilled in the art should recognized there are other ways of aligning cameras so as to capture a plurality of images in the object space and utilize one die to capture a plurality of images associated with each camera. In some embodiments, more than one die can be used where some may have a plurality of images captured with one die and others with only one image per die.

There are advantages of being able to capture images on one die from a plurality of camera assemblies, such as that shown as 1000A on FIG. 4. Such an arrangement can reduce the collective die area and power as compared to the array camera design, such as that shown of 1000B in FIG. 5, where one camera image is captured on one die.

Two object prisms 1010 are shown in the example of FIG. 5 where two cameras share one object prism. There are many configurations where, for example, one object prism can be used for one, two, three or more camera assemblies such assembly 1000A. They are called the "object prisms" because they are used to fold the optical axis of each camera assembly to point out into the object space. There are other possible configurations of object prisms and camera assemblies. In an embodiment an object prism 1010 may utilize a reflective surface 1011 on the prism instead of using the total internal reflection properties of the prism. The object prism 1010 may be replaced by a mirror instead of using a prism. The prism, prism reflective surface, or mirror would reflect the optical axis and the associated object space rays towards the entrance pupil of a camera.

Figure 6:
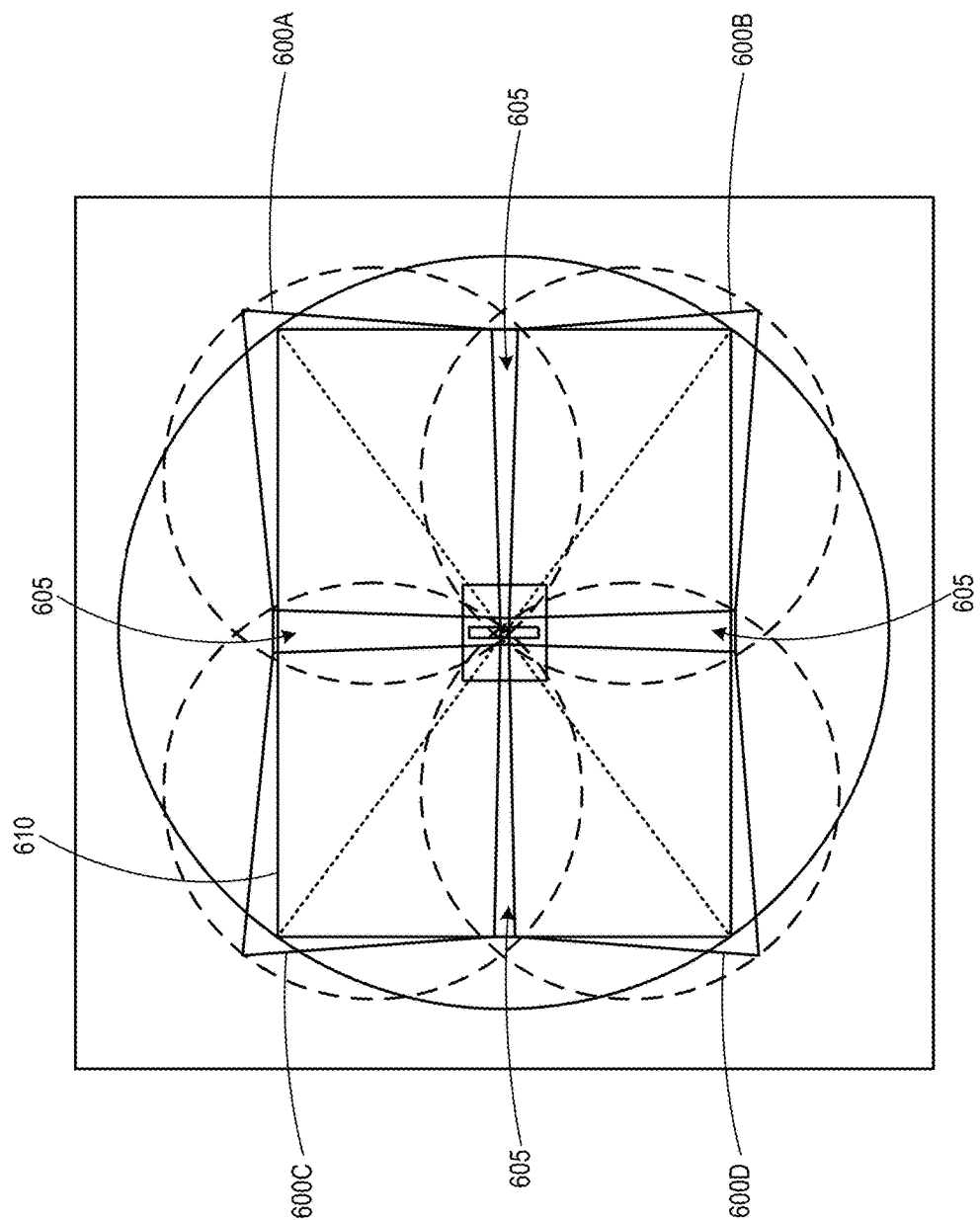
FIG. 6 illustrates an embodiment of the projected fields of view of the folded optic sensor array embodiment.

FIG. 6 illustrates an embodiment of the projected fields of view of the folded optic sensor array embodiment. Fields of view 600A-600D may share areas of overlap 605 as shown. The overlapping fields of view 600A-600D may be stitched into a complete image of the target image scene and cropped to a final image 610 with an aspect ratio such as 4:3 or 1:1.
Overview of Example Optics Performance FIGS. 7A-M illustrate simulated MTF performance of the L1-L6 assembly together with a sensor prism within a range of motion for a movable lens assembly 705 as described herein between approximately 0 and approximately 172 µm. FIG. 7D illustrates an embodiment in which a folded optic design and process are used to focus a camera assembly at 1000 mm in the object space. In the embodiment as shown in FIG. 7D, lens assembly 705, including lens elements L1-to-L5, are moved to the reference position 0.0 micrometers (µm) by the actuator 180, which is the position the camera will be focused at 1000 mm in the object space. In each of FIGS. 7A, 7D, 7G, and 7J the positioning of the lens assembly 705 within the space 710 bounded by the edge 141 of the central prism and the edge 131 of the sensor prism is indicated by the positioning of the vertical dotted lines.

Figure 7A:
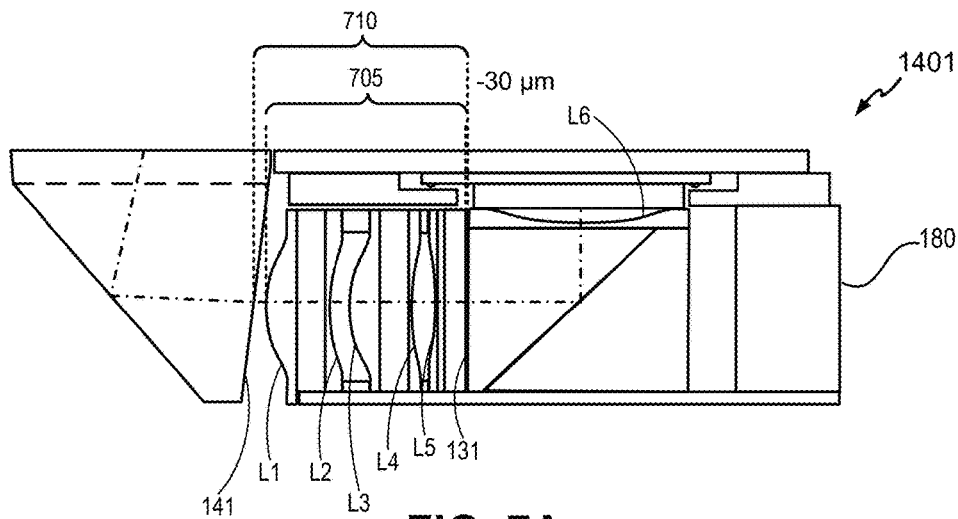
FIG. 7A illustrates an embodiment of a folded optic sensor array having a lens assembly positioned at −30 μm and focused at a distance of 6767 mm.
Figure 7B:
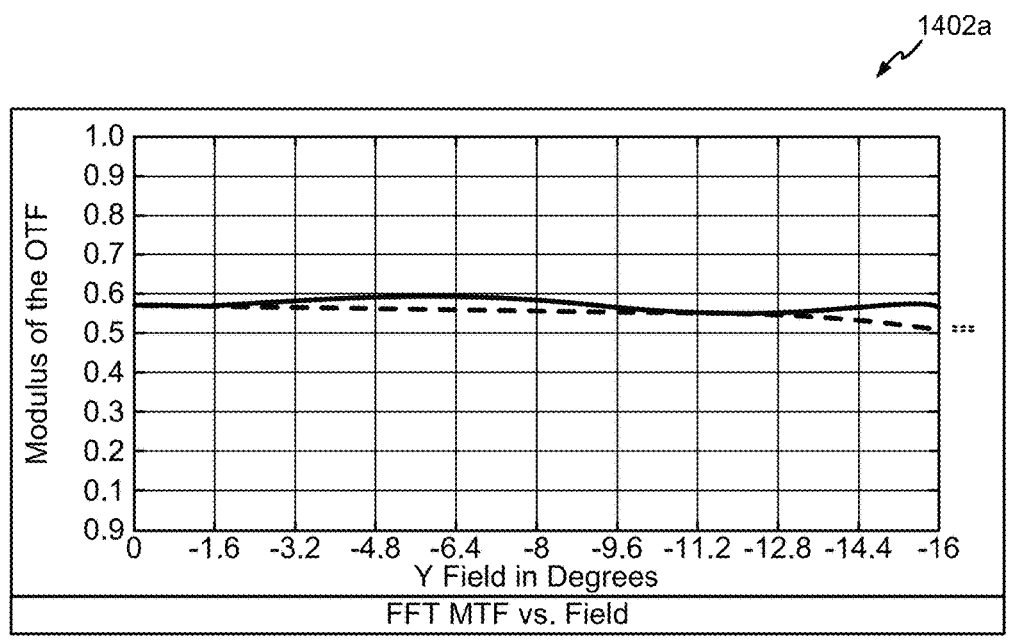
FIG. 7B illustrates a simulated MTF versus field angle performance data for the optics (e.g., lens assembly and sensor prism) of a folded optic sensor array embodiment of FIG. 7A.
Figure 7C:
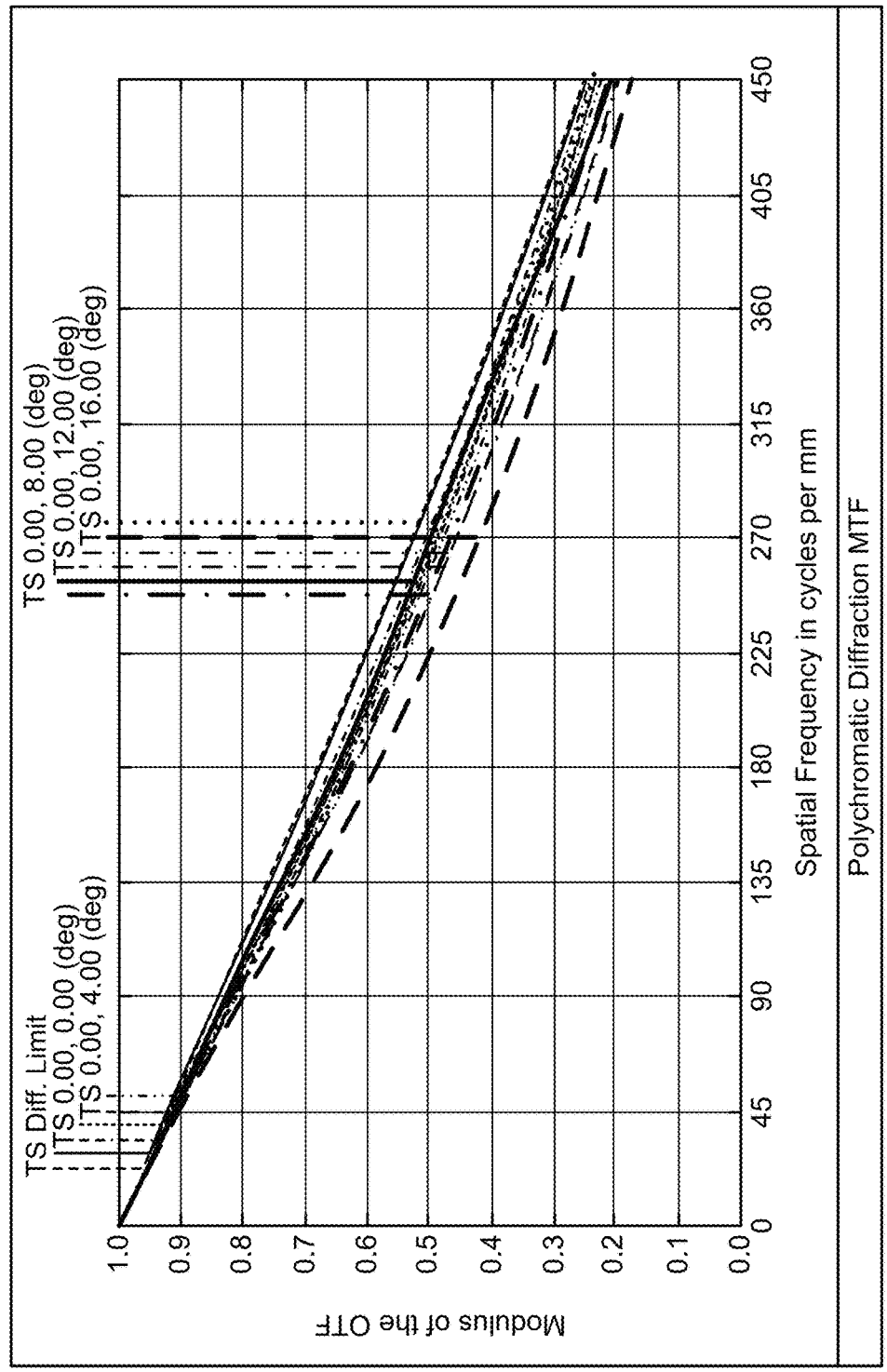
FIG. 7C illustrates MTF versus spatial frequency in cycles per mm, where multiple MTF curves are shown with respect to selected field angles for both sagittal and tangential performance data for the folded optic sensor array embodiment of FIG. 7A.
Figure 7D:
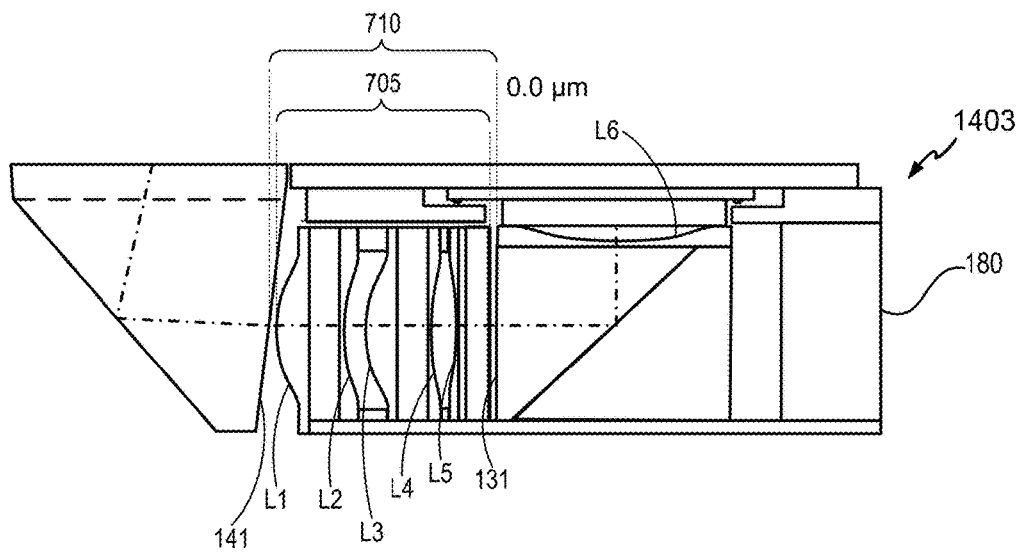
FIG. 7D illustrates an embodiment of a folded optic sensor array having a lens assembly positioned at 0.0 μm and focused at a distance of 1000 mm.

FIG. 7A illustrates an embodiment of a folded optic camera having a lens assembly positioned at −30 µm with respect to the reference position 0.0 µm. In this embodiment, as shown in FIG. 7A, the camera 1401 is focused at a hyper-focus distance of 6767 mm. FIG. 7B illustrates simulated MTF versus field angle performance data 1402a for the optics (e.g., lens assembly and sensor prism) of a folded optic sensor array embodiment of FIG. 7A (the modulus of the optical transfer function "OTF" represents the MTF). In FIG. 7B, the solid line in the graph represents the MTF for a star pattern, and the dashed line in the graph represents the MTF for concentric circles. FIG. 7C illustrates simulated MTF versus spatial frequency data 1402b in cycles per mm, where multiple MTF curves are shown with respect to for selected object field angles for both sagittal and tangential performance data for the optics of the folded optic sensor array embodiment of FIG. 7A. The simulated MTF data can be calculated (or simulated) using an optical simulation program such as, for example, OSLO, ZEMAX, CODE V, etc.

Figure 7E:
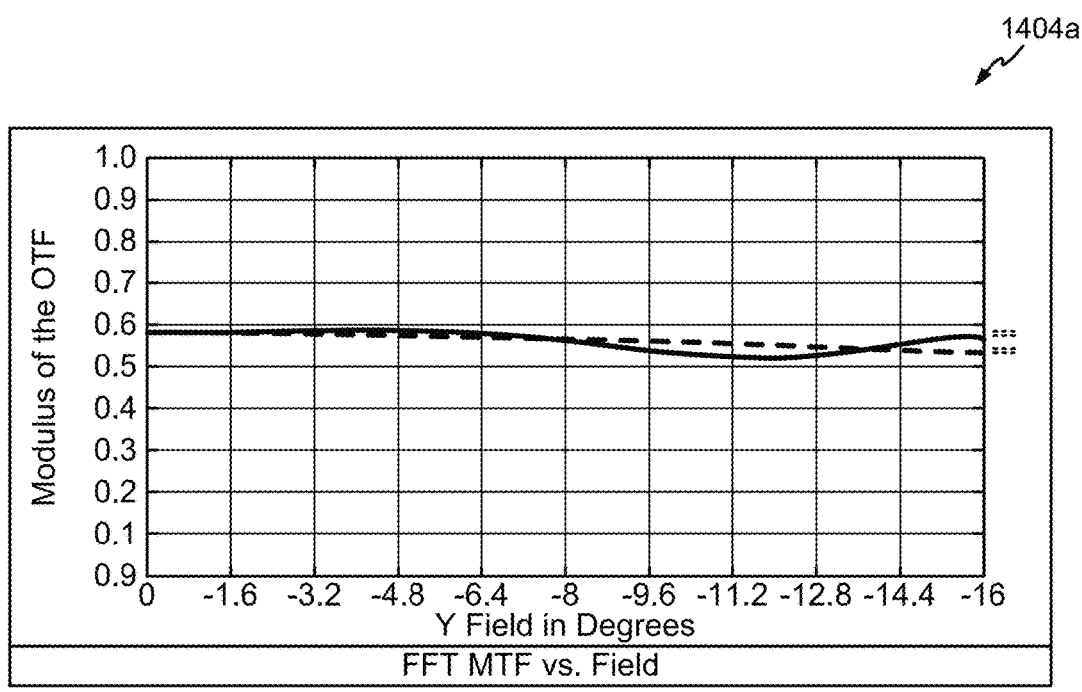
FIG. 7E illustrates a simulated MTF versus field angle performance data for the optics of a folded optic sensor array embodiment of FIG. 7D.
Figure 7F:
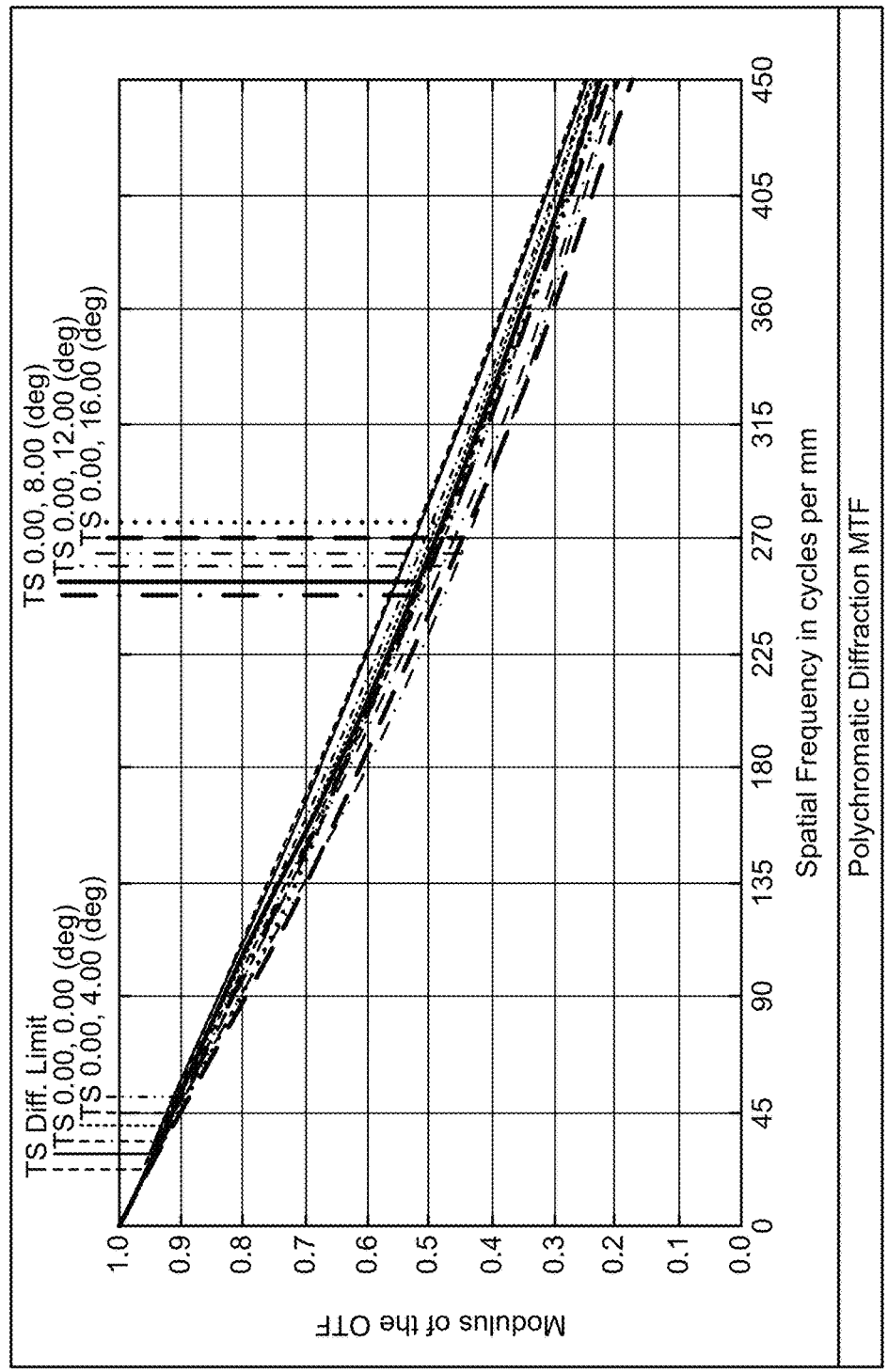
FIG. 7F illustrates MTF versus spatial frequency in cycles per mm, where multiple MTF curves are shown with respect to selected field angles for both sagittal and tangential performance data for the folded optic sensor array embodiment of FIG. 7D.

As described above, FIG. 7D illustrates an embodiment of a folded optic camera having a lens assembly positioned at 0.0 µm and focused a distance of 1000 mm. FIG. 7E illustrates a simulated MTF versus field angle performance data 1404a for the optics of a folded optic sensor array embodiment of FIG. 7D. In FIG. 7E, the solid line in the graph represents the MTF for a star pattern, and the dashed line represents the MTF for concentric circles. FIG. 7F illustrates simulated MTF versus spatial frequency data 1404b in cycles per mm, where multiple MTF curves are shown with respect to for selected object field angles for both sagittal and tangential performance data for the optics of the folded optic sensor array embodiment of FIG. 7D.

Figure 7G:
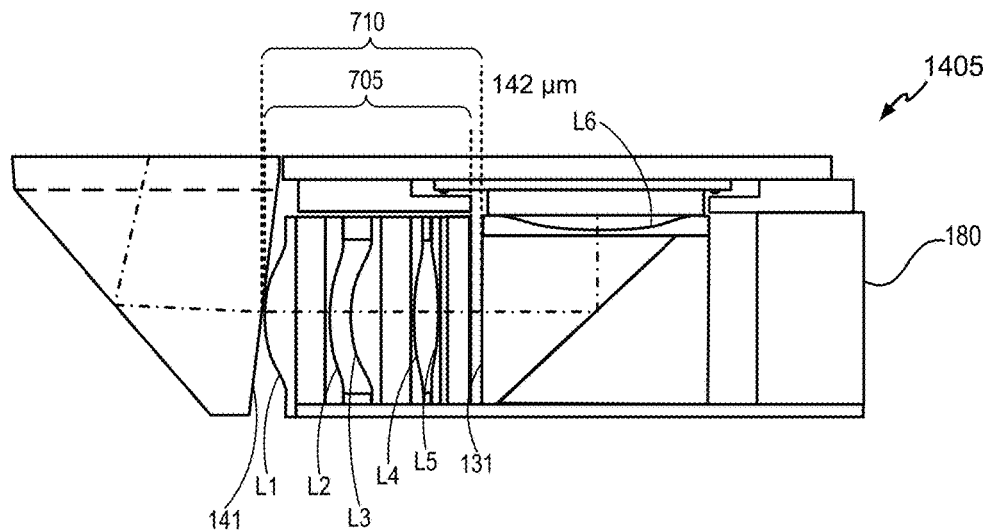
FIG. 7G illustrates an embodiment of a folded optic sensor array having a lens assembly positioned at 142 μm and focused at a distance of 200 mm.
Figure 7H:
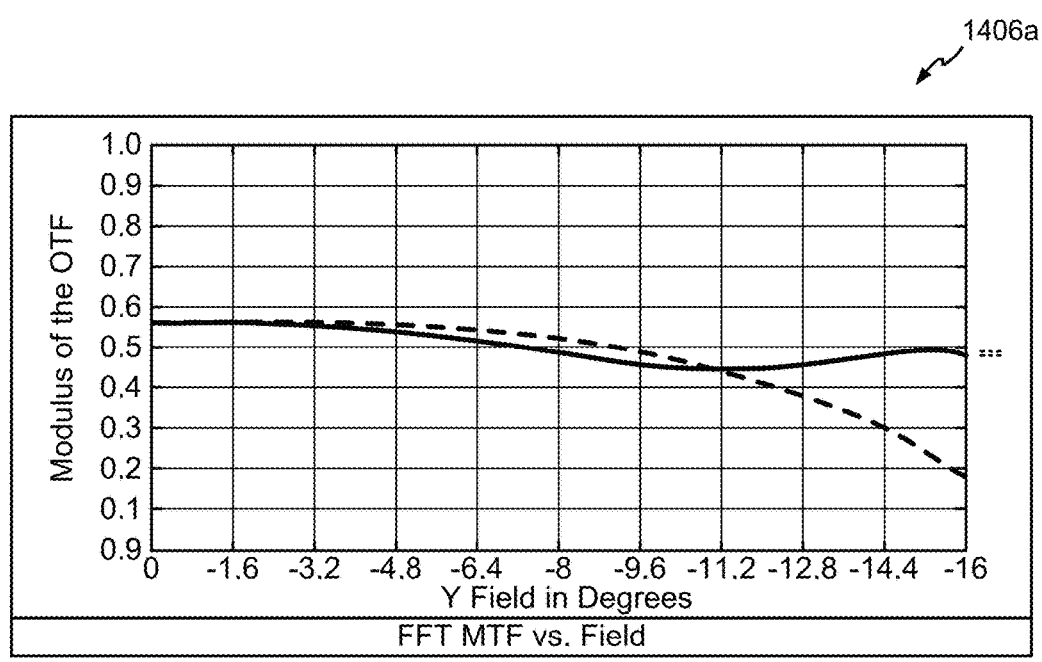
FIG. 7H illustrates a simulated MTF versus field angle performance data for the optics of a folded optic sensor array embodiment of FIG. 7G.
Figure 7I:
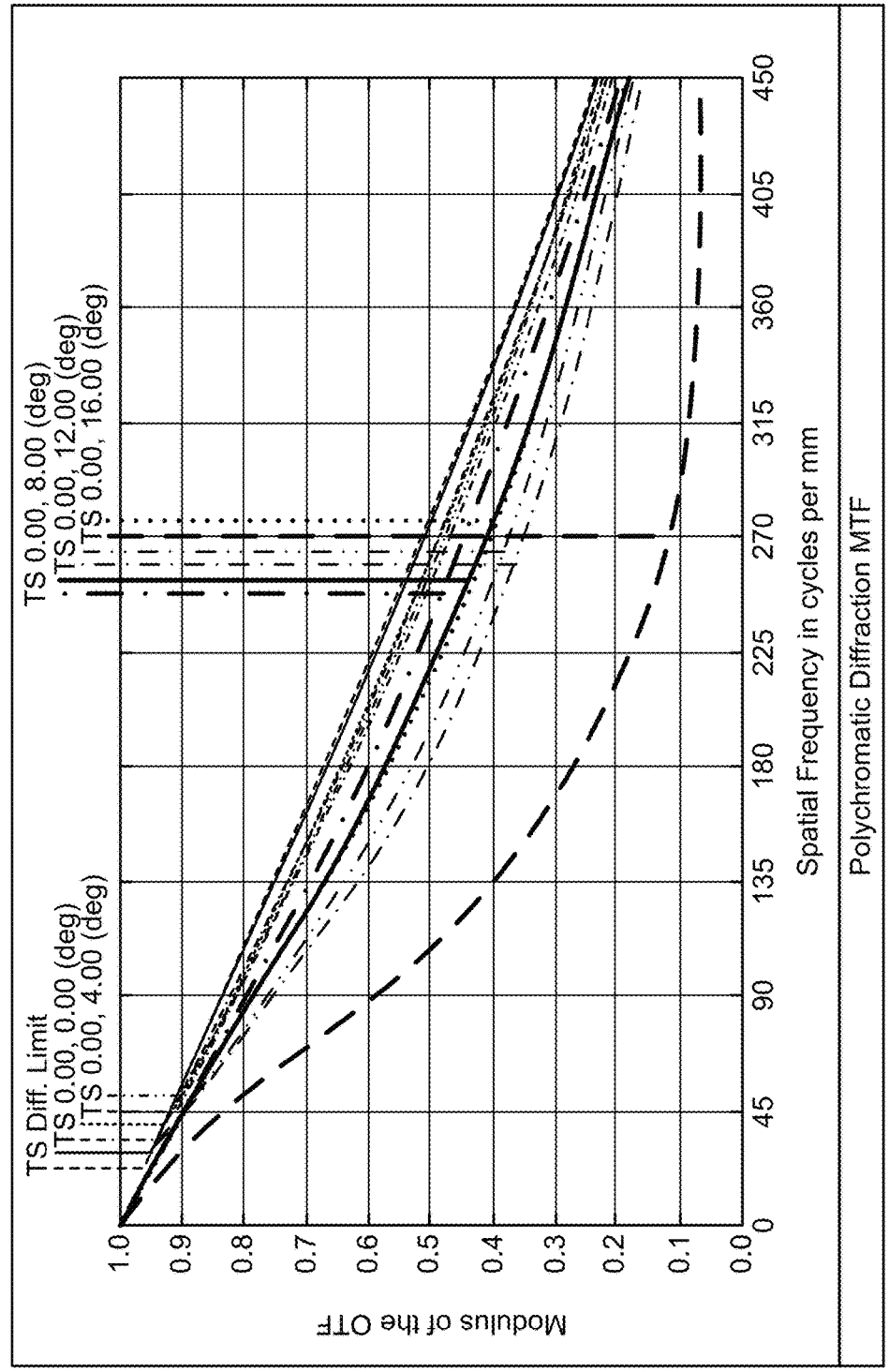
FIG. 7I illustrates MTF versus spatial frequency in cycles per mm, where multiple MTF curves are shown with respect to selected field angles for both sagittal and tangential performance data for the folded optic sensor array embodiment of FIG. 7G.

FIG. 7G illustrates an embodiment of a folded optic camera having a lens assembly positioned at 142 µm with respect to the reference position 0.0 µm. In this embodiment, as shown in FIG. 7G, the camera 1405 is focused at a distance of 200 mm. FIG. 7H illustrates a simulated MTF versus field angle performance data 1406a for the optics of a folded optic sensor array embodiment of FIG. 7G. In FIG. 7H, the solid line in the graph represents the MTF for a star pattern, and the dashed line represents the MTF for concentric circles. FIG. 7I illustrates simulated MTF versus spatial frequency data 1406b in cycles per mm, where multiple MTF curves are shown with respect to for selected object field angles for both sagittal and tangential performance data for the optics of the folded optic sensor array embodiment of FIG. 7G.

Figure 7J:
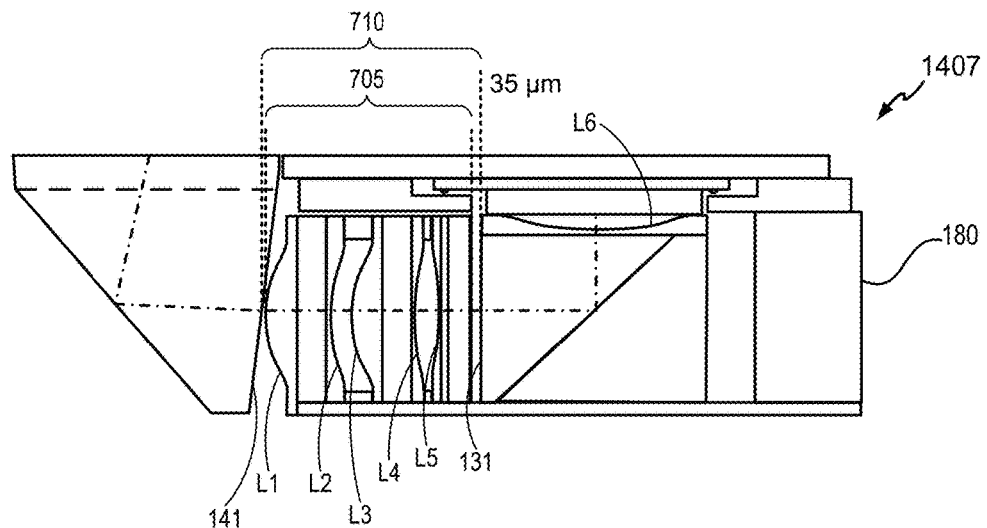
FIG. 7J illustrates an embodiment of a folded optic sensor array having a lens assembly positioned at +35 μm and focused at a distance of 500 mm
Figure 7K:
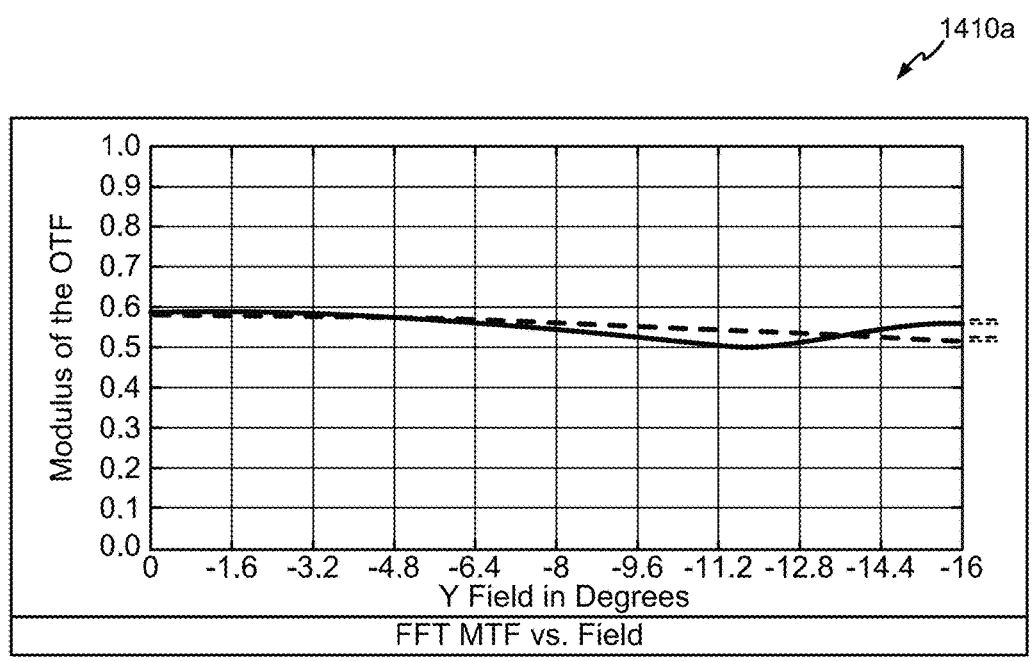
FIG. 7K illustrates MTF versus field angle performance data for the folded optic sensor array embodiment of FIG. 7J.
Figure 7L:
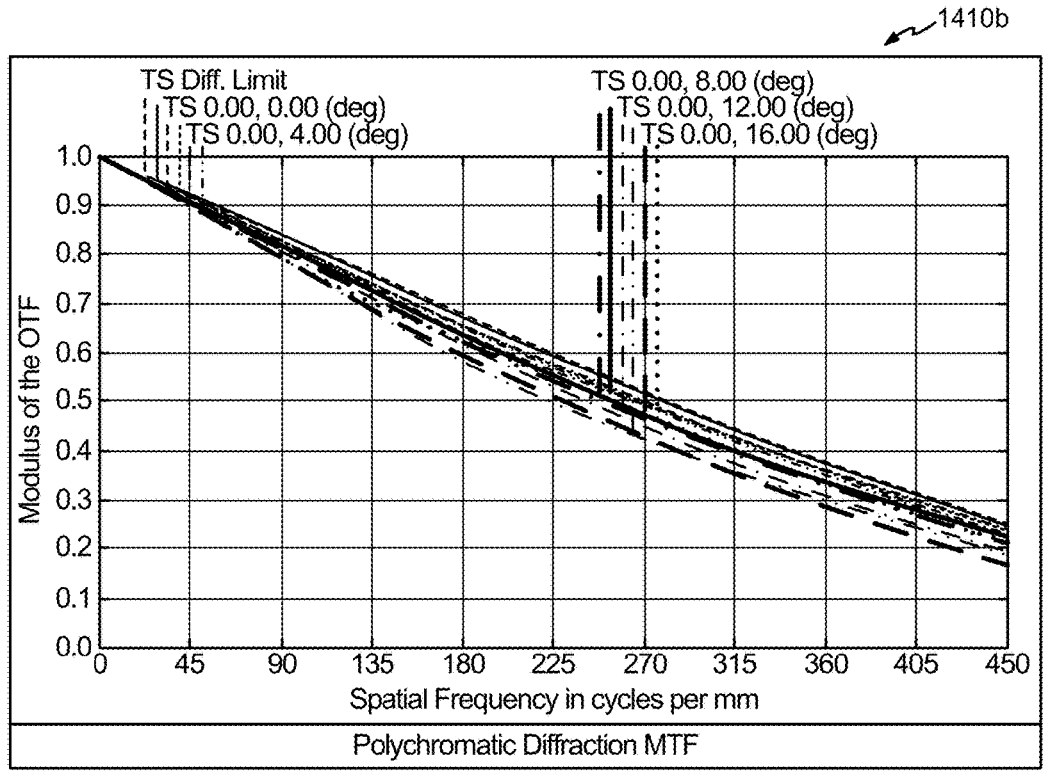
FIG. 7L illustrates MTF versus spatial frequency in cycles per mm, where multiple MTF curves are shown with respect to selected field angles for both sagittal and tangential performance data for the folded optic sensor array embodiment of FIG. 7J.

FIG. 7J illustrates an example of an embodiment of a folded optic camera having a lens assembly positioned at 35 µm with respect to the reference position 0.0 µm. In this embodiment, as shown in FIG. 7J, the camera 1407 is focused at a distance of 500 mm. FIG. 7K illustrates a simulated MTF versus field angle performance data 1410a for the optics of a folded optic sensor array embodiment of FIG. 7J. In FIG. 7K, the solid line in the graph represents the MTF for a star pattern, and the dashed line represents the MTF for concentric circles. FIG. 7L illustrates simulated MTF versus spatial frequency data 1410b in cycles per mm, where multiple MTF curves are shown with respect to for selected object field angles for both sagittal and tangential performance data for the optics of the folded optic sensor array embodiment of FIG. 7J.

The MTF curves shown in 1402a, 1404a, 1406a, and 1410a in FIGS. 7B, 7E, 7H, and 7K are examples of MTF performance of the L1-L6 assembly when the camera is focused at the distances shown in FIGS. 7A, 7D, 7G, and 7J respectively. The graphs show the MTF curves at angular direction, with respect to the optical axis, in the field of view (FOV) of the camera, shown on the graphs as "Y Field in Degrees," where the spatial modulation frequency is 225 cycles per mm.

The sensor of each camera may have its own MTF, based in part on sampling theory where the MTF rolls off as a function of the aperture (or apertures) of the pixels and sampling pitch of the pixels, where the sampling pixel pitch can affect the measured MTF performance should artifacts such as aliasing be present. Therefore, in some examples, the simulated optics performance of FIGS. 7B, 7C, 7E, 7F, 7H, and 7I 7K and 7L may not match the measured MTF performance of each single camera in the array camera when the MTF measurements are made using the recorded pixel outputs of an image sensor, for example, the digital values recorded for each of the pixels read from the image sensor pixels. Measurements can be taken over a sufficient number of pixels in order to make an MTF measurement versus cycles per mm. In some implementations a pixel value can be output to an analog buffer that may add electrical noise and therefore affect the final digital value of the pixel recorded in a memory. Accordingly, when the measured MTF includes the MTF performance of the optics only (for example, without the use of the recorded pixel outputs of an image sensor or other intermediary means that would affect the measured MTF of the optics only) and the MTF of a the recorded pixel outputs of an the image sensor used with a the particular optics under measurement the MTF measurements may not match the simulated MTF performance such as that shown in graphs 1402a, 1402b, 1404a, 1404b, 1406a, 1406b, 1410a, and 1410b. A person having ordinary skill in the art should also recognize there are other factors that may affect the MTF of a sensor such as noise components that may be included as part of the recorded output from a pixel in the image array, which is/are not included, considered nor shown in this disclosure. Also, there are many other factors that may affect the recorded output from a pixel in an image sensor that are not included, considered nor shown in this disclosure, such as noise sources added by the electronics or other mediums to convey a the pixel level and possibly an Analog-to-Digital (ADC) converter systems that may be part of the recording process to capture a the image sensor pixel output. There may be other factors that may affect the MTF of an image sensor that are not included, considered nor shown in this disclosure herein. The optics are designed in the embodiments of FIGS. 7A-7M to be used across +/−16 degrees.

For the focus positions 6767 mm, 1000 mm, and 500 mm the corresponding MTF curves 1402a, 1402b, 1404a, 1404b, 1410a and 1410b are shown and are approximately equal for both tangential and sagittal MTF simulated performance across the entire "Y Field in Degrees" (e.g., from 0 degree to −16 degrees about the optical axis) and across the range of image spatial frequencies from zero to above 450 cycles per mm.

For position +142 μm the sagittal simulated performance remains near 50% MTF across the entire Y Field in Degrees from zero to −16 degrees as shown in graph 1406a and remains close to the diffraction limit as shown in 1406b, where the diffraction limit shown in graphs 1402b, 1404b, 1406b and 1410b is the maximum MTF curve shown in these graph. However the tangential MTF performance deviates from the sagittal performance as the Y Field in Degrees is increased. This means this embodiment is near the shortest distance where useful images can be captured, where useful MTF resolution is achieved for the sagittal MTF performance and useful but reduced MTF performance is achieved for the Tangential MTF performance.

For the focus positions 6767 mm (the hyper-focus position in this embodiment), 1000 mm and 500 mm and the corresponding MTF graphs 1402a, 1402b, 1404a, 1404b, 1410a and 1410b, are shown and are approximately equal for both Tangential and sagittal MTF performance data across the entire Y Field in Degrees (e.g., from 0 degree to −16 degrees about the optical axis) and across the range of image spatial frequencies from zero to Nyquist in 450 cycles per mm. The Nyquist sample rate for a sensor having a square pixel of 1.1 μm is 454 cycles per mm.

As illustrated, the sagittal and tangential MTF performance data shown in graphs 1402b, 1404b and 1410b are close to the diffraction limit, where the diffraction limit shown in graphs 1402b, 1404b, 1406b and 1410b is the maximum MTF curve shown in these graphs.

For position +142 μm the sagittal performance data in graph 1406a (FIG. 7H) remains near 50% MTF across the range of object angles full Y Field in Degrees from zero to −16 degrees and remains close to the diffraction limit as shown in graph 1406b. However the tangential MTF performance data in 1406b drops to about 18 percent at 16 Y Field in Degrees when MTF shown in FIG. 1406a is for 225 cycles per mm. The Half-Nyquist sample rate is about of 225 pixel samples per mm when the pixel pitch is 1.1 um. MTF values around 20 percent are generally considered by those skilled in the art to be detectable. This means the lens system may not be able to yield detectable MTF data above 225 cycles per mm when Y Field in Degrees is above 15 degrees.

It may be desirable to design the lens assembly system so the sagittal and tangential MTF performance data are close to the lens diffraction limit curve across the spatial frequency range from zero to an image sensor spatial Nyquist sampling rate. In some embodiments, it can be desirable for the lens assembly MTF performance to be near the diffraction limit curve at nearly all object field angles in order to have uniform MTF performance across the full field of view of the camera. It can also be desirable these conditions be meet across the full focus range requirements of the system, such as the focus distance of 200 mm to the hyper-focus distance of 6767 mm.

The f-number and the lens assembly aperture may affect the diffraction MTF limit curve of the lens assembly. The minimum achievable height H, as shown in FIG. 1A, may in part be determined by knowing the field of view of the camera system, the lens assembly MTF performance data curves and the sensor array MTF response associated with the pixel apertures and the sensor spatial sampling rates in pixels per mm (for example, pixel pitch). From this information one may be able to determine the minimum aperture of the lens assembly and thereby may be able to determine the minimum achievable height H. If the MTF curves of the lens assembly are close to the diffraction limit, then the lens assembly height H may be near the minimum height possible for a particular camera design and associated diffraction limit. One embodiment of an optimum camera design (for example, where optimum means the lens MTF curves across the FOV and the spatial frequencies up to the Nyquist sample rate are close to the diffraction limit across the range of desired focus distances the optical design may be near the minimum height H achievable) can be considered as having the minimum clear aperture that will meet the MTF 20% rule; that is, the MTF of the camera system including the MTF reduction associated with the pixel apertures and sample rates should be at, or substantially at, about 20 percent at the image sensor Nyquist sampling rate. As pointed out herein other factors may affect the MTF that are not taken into account in this example.

If the lens assembly MTF curves plus the MTF reduction, caused by the pixel aperture and pixel spatial sample rate (for example, pixel pitch), increase or decrease the MTF significantly from about 20 percent at the Nyquist sample rate, then final image may have degraded performance caused by noticeable aliasing artifacts or having less resolution performance in cycles per mm than that achievable for the sensor pixel aperture and spatial sample rate (i.e. the pixel pitch Nyquist sample rate). In other words, if the MTF of the optical system and that of the image sensor combined produce an MTF of significantly less than 20% at the Nyquist Sample rate, then spatial frequencies in the scene may be reduced to less than that that can be achieved without noticeable aliasing artifacts.

If the tolerances of the system (e.g., the amount of motion allowable for the rotational and translational variations about the ideal optical axis, among other aspects) cause the MTF to go down then the aperture of the lens assembly potentially can be increased so as to keep the MTF above or near the 20 percent rule. It is therefore desirable to keep the tolerances and potential variations as low as possible in order to achieve as close as possible an optimum height H camera design.

Figure 7M:
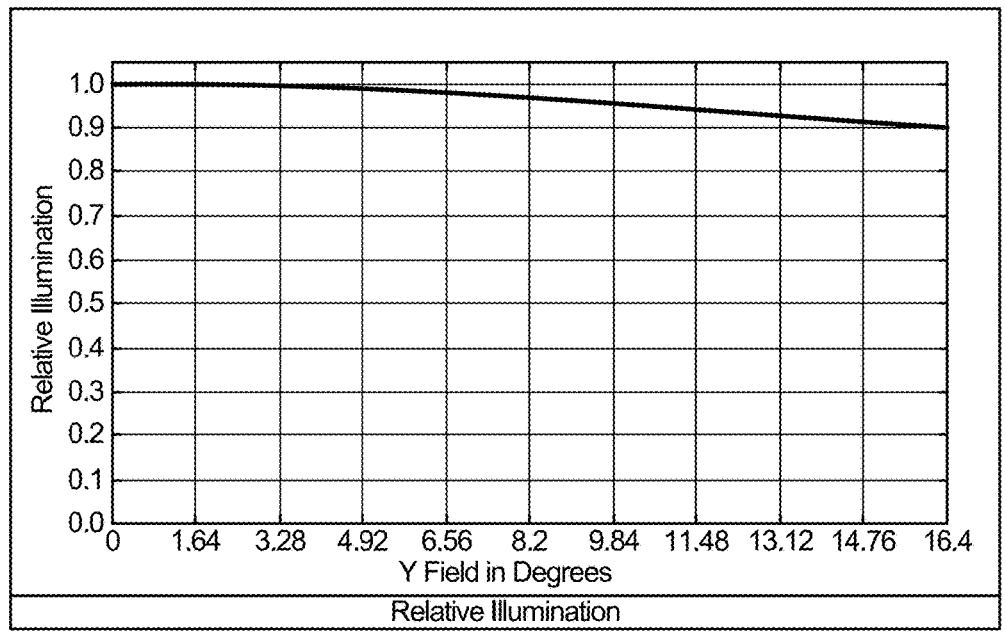
FIG. 7M illustrates the relative illumination for the folded optic sensor array embodiments shown in FIGS. 7A, 7D, 7G and 7J.

FIG. 7M shows the simulated relative illumination of the lens assembly. As illustrated, the relative illumination decreased only 10 percent across the FOV, which is typical using a narrow FOV such as +/−16 degrees. This means it is possible to have low relative illumination roll-off when the images are stitched together.

In some of the autofocus assembly embodiments described herein, L6 can be attached to the sensor prism, and then the L6 plus the sensor prism can be mounted or permanently mounted either to the image sensor cover glass or directly to the image sensor. This can prevent the sensor prism from tilting or shifting relative to the sensor while an auto-focus process is taking place or tilting or shifting under the influence of other factors such as gravity, motion or temperature.

Mounting the L6 plus the sensor prism to either the sensor or cover glass can provide benefits to overcome potential detrimental effects on the MTF performance of the lens assembly design shown in FIGS. 1A and 1B may be sensitive to the amount of rotational tilt error and linear translational error with respect to the ideal optical axis 123. To overcome this sensitivity, the embodiments herein can provide a lens assembly and autofocus method that does not require moving the sensor prism plus L6 with respect to the image sensor. The benefits of attaching the sensor prism plus L6 to the image sensor image plane include reducing the MTF sensitivity to rotational tilt and linear translational deviations from the ideal optical axis with respect to the image sensor image plane. Once the alignment between the image sensor prism plus L6 to the image sensor plane is accurately done during the assembly process the remaining tilt and translational errors should mostly occur between the L1 to L5 lens assembly 705 and the sensor prism. Use of the guide rail or other suitable devices as described herein can serve to reduce or restrict tilt or translational errors from the ideal optical axis of the L1 to L5 lens assembly 705 with respect to the fixed unit comprised of the sensor prism, L6 and the image sensor.

Conceptually, if we represent an image sensor "visualized" image plane as plane where light rays can pass through unobstructed, we can look for the ideal visualized plane location and orientation that will yield the highest optimum uniform MTF performance as measured across the visualized image plane surface representing the image sensor image surface. As an example, a best or most clearly focused image formed by the optics in the image space (or light field) in front and/or behind the plane of the image sensor image plane may not be aligned parallel with the image sensor image plane, and in some examples the best focused image in the light field space in front and/or behind of the image sensor image plane may not be a plane, but rather a contour where one may be able to align a plane within the contour to form a best fit. In this instance the MTF performance across the image sensor image plane, when best fit image plane in the light field is optimum focused on the image sensor image plane, may have reduced MTF performance across the image sensor image plane with respect to the ideal design. This topic will be further covered when we discuss the ray trace diagram shown in FIG. 9. In some implementations, the long rays traveling from the secondary light folding surface 135 (as shown in FIGS. 1A and 1B) to the image sensor image plane will magnify the effects of rotational variations of the sensor prism plus L6 with respect to the ideal optical axis intersecting the sensor image plane.

If the sensor prism is moved only back and forth along the optical axis 123, then the distance from the L5 lens surface to the secondary light folding surface 135 will increase or decrease along the optical axis 123. The optical axis, when projected on the image sensor image plane, may shift its intersection point relative to a reference point on the image sensor image plane. Accordingly, when the sensor prism when is allowed to move within a given rotational and/or translational set of ranges, the intersection of the optical axis 123 with the image sensor image plane may deviate by a linear distance from a reference point on the image sensor image plane.

In some embodiments, the sensor prism plus L6 as shown in FIGS. 7A, 7D, 7G, and 7J may cause a change in a location where the optical axis intersects image sensor image plane when the sensor prism plus L6 is moved up or down in the plane of the page. The L6 surface may cause the optical axis 123 to deviate in angle from an ideal angle normal to the image sensor image plane, which may reduce the MTF performance as a function of the amount of such translational variation and the shape (for example, curvature) of the L6 lens element design.

The purpose of describing these variances is to point out the importance of minimizing the rotation and translational variations of the sensor prism with respect to the idea reference point and ideal image sensor image plane. An example of how this can be done is to affix the sensor prism plus L6 to the image sensor glass plate if present, or to the image sensor image plane if the image sensor glass plate is not present. This can prevent rotational variations of the sensor prism plus L6 with respect to a reference point on the image sensor plane. Once this is done the remaining variations will be between the movable lens assembly 130 and the sensor prism, e.g. the rotational and translational variations of lens assembly 130 with respect to the optical axis 123, where that optical axis starts from a point on the image sensor image plane, travels through L6, the sensor prism, bends at the reflective surface 135 and emerges from the sensor prism along the optical axis 123. Methods and systems are described with respect FIGS. 8A, 8B and 8C that can help to reduce or minimize these rotational and translational variations of lens assembly 130 with respect to the aforementioned optical axis 123.

Overview of Example Autofocus Components

Figure 8A:
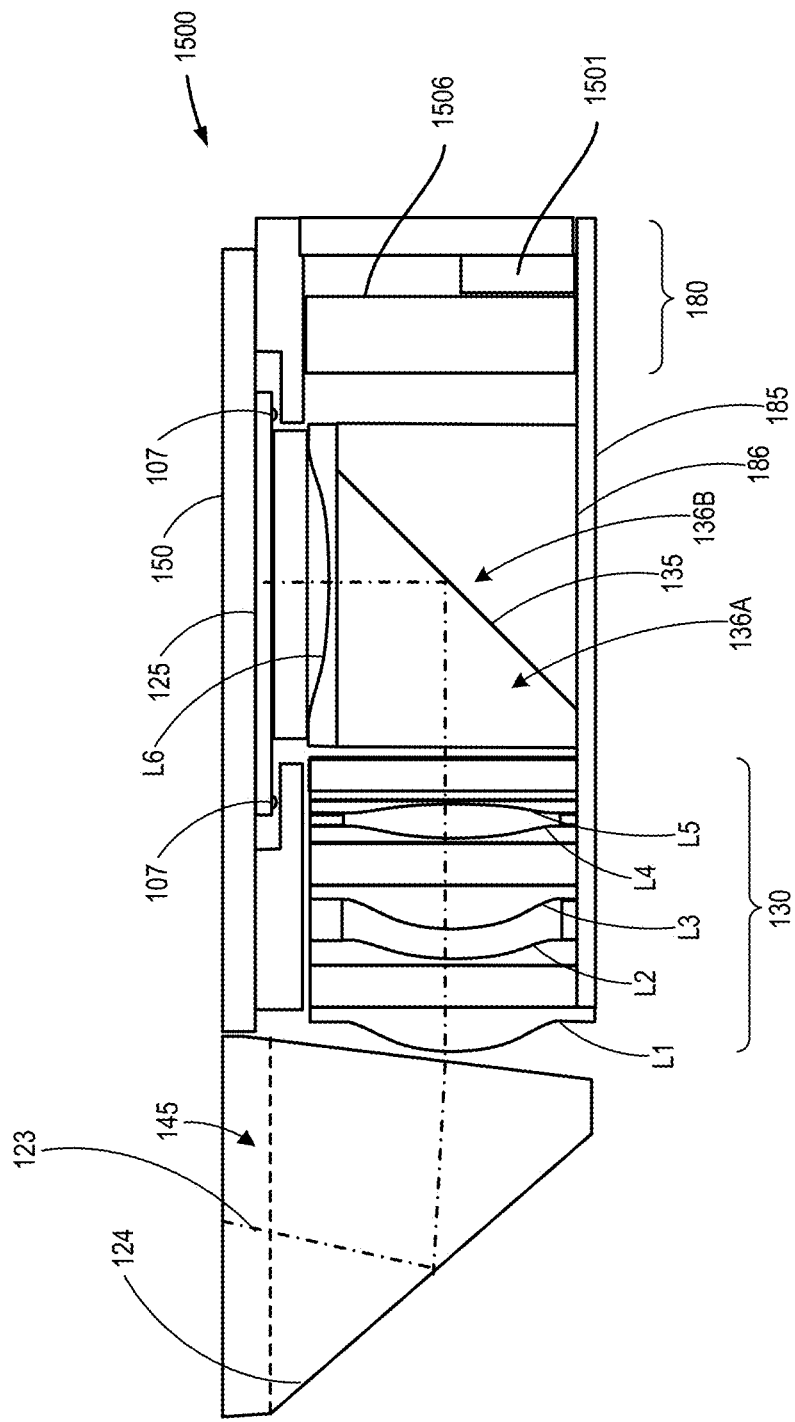
FIGS. 8A-C illustrate an embodiment of where a folded optic sensor assembly is moved to obtain auto-focus.
Figure 8B:
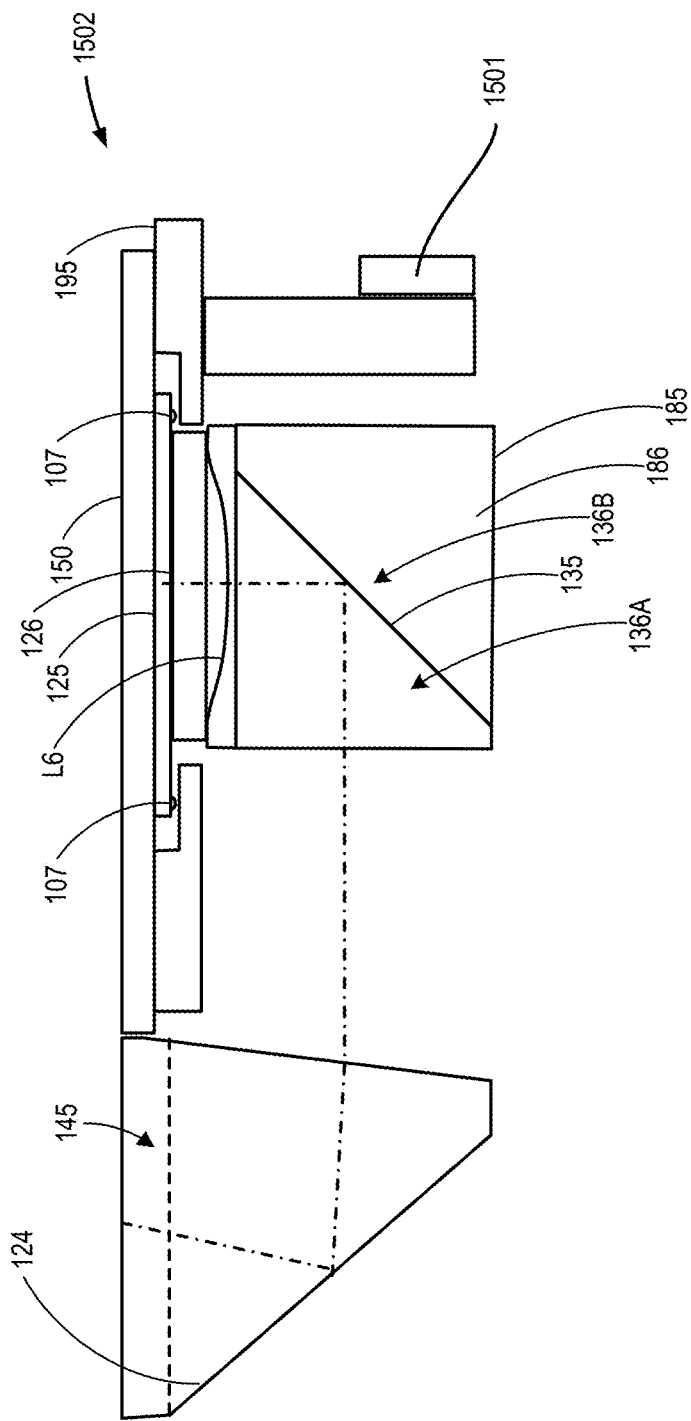
Figure 8C:
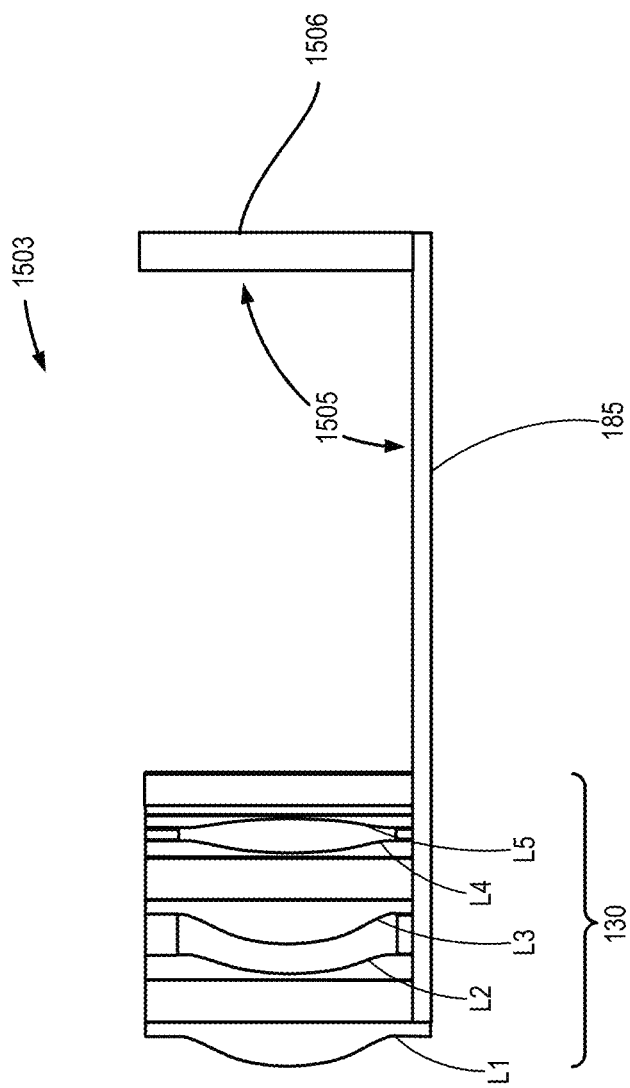

FIGS. 8A through 8C illustrate one embodiment of a design 1500 on how the lens assembly L1-to-L5 130 are moved back and forth with respect to the sensor prism by a motor device 1501, where the sensor prism can include prism 136A plus block 136B and reflective surface 135. By moving assembly 130 back and forth the focus position in the object space can be changed. FIGS. 8A through 8C illustrate how, in this embodiment, the lens elements L1 to L5 are moved back and forth to increase or decrease the distance between lens surfaces L5 to the sensor image plane surface, and thereby increasing or decreasing the focal length.

FIG. 8A illustrates the complete assembly 1500, including the components described above with respect to FIG. 1A.

FIG. 8B illustrates an example of a stationary portion 1502 of a complete camera assembly 1500 including substrate 150, actuator 1501, sensor 125, cover glass 126, lens L6, refractive prism 145 including primary light folding surface 124, and secondary light folding surface 135 between refractive prism 136A and block 136B. The actuator can be secured to a support member (e.g., circuit board 195) that, in turn, is secured to the sensor substrate 150.

FIG. 8C illustrates an example of a movable portion 1503 of the camera 1500 including a guide rail 185, movable portion 130 of the lens system including lens surfaces L1-L5, and an actuator contact member 1506. The movable lens assembly 130 can include a number of lenses shaped and positioned to provide the desired focus length. The particular lens configuration shown for the movable lens assembly 130 is meant to provide an example, and any lens configuration capable of maintaining good image performance while moving within the tolerances of the folded optic system can be used. The guide rail 185 can contact the lower surface of the refractive prism 136A and block 136B to stabilize the rotational movement of the movable lens assembly 130 (in the roll, yaw and pitch directions) to within tolerances as well as the translational movement (in the up and down or left and right direction) of the movable lens assembly to within tolerances.

In this embodiment the method to hold the assemblies, such as 1503 to assembly 1502, are not shown. Examples of such methods include, but are not limited to, using glides and/or interlocking grooves. One or more magnetic fields, such as induced by magnets not requiring a power source and/or magnetic field generators that do/can require power sources, can be used to lower the resistance between mechanical parts and/or assemblies such as the stationary portion 1502 (FIG. 8B) and the movable portion 1503 (FIG. 8C) of the camera. For example such glides and/or interlocking groves with, for example, having two magnetic fields. One magnetic field could be around 130 and a second one could be around the motor area 180 or other locations in such as assembly 1500. Whereas the traditional mobile device lens barrel is suspended by normally one magnetic field and thereby bring about more translational X, Y and Z displacement and/or rotational displacement such as roll, pitch and yaw.

Another embodiment of a suitable folded optic system is to use the mirror surface 135 as a secondary light directing surface without a surrounding prism. Accordingly, illustrated element of prism portions 136A, 136B are removed and only the mirror surface 135 remains. A structure design to secure a mirror 135 can be used to guide the guide rail 185.

By holding the tolerances with tighter tolerances than that of a traditional mobile device, influences of forces (e.g., acceleration and deceleration of the camera system) and vibrations from influences within and outside the camera systems can be prevented, abated and/or minimized.

There are many other forms of suspension other than magnetic fields, for example, such methods that could be used include one or more of oil, ball bearings, air, gas, lubricating liquids or solids, or the like.

One advantage of the folded optic multi-sensor assemblies described herein is the ability to use long guides and one or more suspensions such as using, for example, magnetic fields, ball bearings and liquids such as oils to keep devices like, but not necessarily, to aid in keeping the stationary portion 1502 and the movable portion 1503 of the camera within tight tolerances. Such tolerances, for example, can be translational movement tolerances like X, Y and Z linear directions and the rotation movement tolerances like roll, pitch and yaw, where the meaning translational movement, rotational movement, pitch movement, roll movement, and yaw movement can be found in literature. The reference directions for these tolerances are not shown because it will depend on the particular design used.

Another advantage is there is room to provide structures that are electrical and/or mechanical between and around the camera assemblies 1000A and/or 1500. One such structure could be interlocking electrical and/or mechanical devices to control the focus positions for 1, 2 or more camera assemblies 1000A and/or 1500. The embodiments of the present application are not limited to mobile camera devices and are equally applicable to camera devices and imaging systems of any type.

A key advantage of folded optics is that position indicators can be used such that an appropriate process can make use of this information. There may be more room for such position indicators within the lens assembly 1000A and/or 1500. There may also be more room within the array camera housing to hold one or more cameras. Such additional cameras can assist with depth detection to be used to assist with focusing a lense assembly or lens assemblies of the array camera. Such position indicators can be placed on the housing and/or assembly substrates like that shown in FIG. 5.

Whereas the housing is a structures that may surround the assembly camera modules and/or the assembly substrate 1004 either partially or completely.

In other embodiments, and optical designs the location of movement between lens surfaces, L1 to L6 may be different, but the same concepts as described herein apply. The number of surfaces can be different for other optical designs. Other implementations could be used such as changing the curvature of one or more surfaces such as that of a liquid lens or other technologies. Some advantages of such implementations are, for example: the optical axis of one camera relative to the others in the array does not change position, which is an important consideration when stitching images together. It is possible to implement a position indicator of the moveable lens assembly. With this information a module or an external device, like an image sensor processor (ISP), can estimate the distance the camera is focused at. Knowledge of the focus location for each camera in the array can help with how to stitch the images together and enable unique other features like provide extended (depth of field) DoF images by focusing each camera at different distances. Calibration can be used to determine within reasonable certainty whether each of the cameras has obtained good focus.

Another embodiment is remove prism block 136A and keep only the mirror surface 135. The mirror surface can be attached to a plate, a supporting block like 136B or other means. Around the mirror a structure can be placed to keep the mirror firmly aligned and stationary with respect to image plane surface of an image sensor 125, where the mirror, L6 and the image sensor 125 will not move relative to each other. The structure used to firmly hold the sensor 125, L6 and the mirror surface 135 in place can also be designed to support the movable system 1503 shown in FIG. 8C. Whereas all items described where 136A and 136B are in the embodiment now also apply to this case were they are not in the embodiment.

Figure 9:
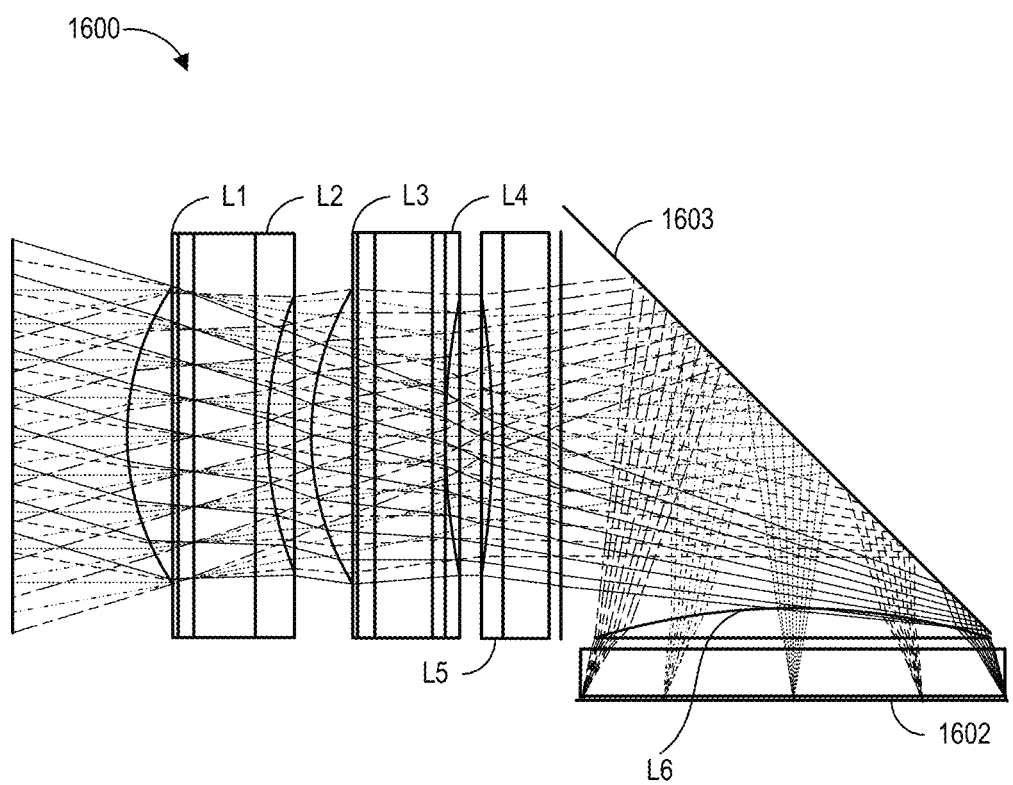
FIG. 9 illustrates a ray trace of light as it passes through an embodiment of a lens assembly for a folded optic image sensor.

Another embodiment is to use a "U" bracket instead of a rod like 185 shown in FIGS. 8A and 8C. This "U" bracket can glide over all three surfaces of a sensor prism 136A and block 136B or the mirror support structure as described above. This will add additional support to minimize or restrict tilt and linear translational variations or movement Overview of Example Ray Trace FIG. 9 shows a ray trace of light as it passes through an embodiment of the lens assembly 1600, traveling through lens surfaces L1 to L5, reflecting off of surface 1603, passing through lens surface L6 and on to the sensor surface 1602. In this embodiment, five groups of light rays are shown using different dashing for purposes of clarity in following the groups of light rays through the lens assembly 1600. Each group is from a different point in the object space relative to the optical axis and far enough away to be consider being at infinity. As these rays travel through the optical surfaces L1-L6 they progressively cluster together, as shown in FIG. 9, as they move closer to the sensor surface 1602.

The embodiment of the lens assembly 1600 illustrated in FIG. 9 does not have structures 136A and block 136B as shown in FIGS. 8A and 8B, instead showing only the mirror surface 1603. The support structure holding the mirror surface 1603 is not shown and the support structure for the moveable structure 1503, as shown in FIG. 8C, is also not shown in FIG. 9. In FIG. 9 the rays are shown entering L1 from 5 different object heights in the camera's FOV of the object space and travel through the optical lens system L1 to L6 and end at the sensor image plane surface in 5 different image heights.

A mirror 1603 may be used to reflect the rays toward the image sensor surface (for example, the image sensor image plane 1602). Assuming that the lens L6 directly above the image sensor is not present, it becomes apparent the light rays must past a long distance from the last lens surface of L5 in the horizontal lens assembly (where horizontal refers to a plane parallel to the plane of the image sensor surface 1602 to the mirror 1603 and then arrive at the surface of the sensor 1602. Accordingly, lens surface L6, sometimes called a "Field Corrector", is placed close to the image plane to make final corrections to the rays so they converge as close as possible to a point on the sensor surface 1602. Such a lens is placed close to the image plane, where part of its function is to make adjustments of the ray so they are better focused across the full image height. Lens L6 has advantages due to its ability to afford minor corrections to the progression of light through the system which will enable the ability to image high resolution images on the image sensor surface, whereas a system without lens surface such as L6 may not be able to achieve the same level of MTF resolution.

Overview of Example Optical Performance for Particular Pixel Pitches

Figure 10A:
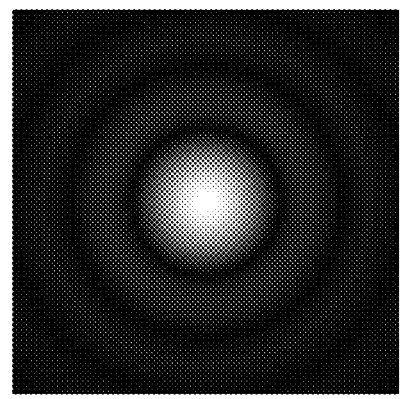
FIG. 10A illustrates an example of a PSF pattern on an image sensor.

FIG. 10A illustrates a point spread function (PSF) pattern that may be imaged on an image sensor plane, for example of an image sensor of the array, from a point in the object space. The following discussion of the PSF pattern relates to determining a suitable pixel pitch for use with the L1-L6 lens assembly or another lens assembly satisfying the performance criteria for use with an array camera as described herein. The trend toward smaller square pixel pitch sensors of approximately 1.1 micro-meter, 1.0 micro-meter and sub-micron pixel sizes has imposed tighter tolerance requirements on lens designs in order to be able to resolve fine features in an image, such as two adjacent points or two adjacent fine lines. If the lens assembly does not have sharp enough focus, such fine features may not be resolvable. This can be understood by the analogous concept of an impulse response for a system, such as the response of a linear electrical filter in the time domain. Turning now to a lens system, instead of having an impulse response in the time domain such as that of an electrical filter, lenses have a PSF response to a point object in the object space when imaged and focused on an image plane surface in the image space. The width of this PSF can be used as a metric to determine the smallest pixel size that makes a good match for a particular lens. The Rayleigh criteria can also be used as a metric to determine the size of a pixel that is a good match for a particular lens.

The objective of the L1-L6 lens assembly, or a similar assembly used in place of the L1-L6 assembly, is to meet the MTF and PSF resolution requirements set forth herein for small pixels, for example 1 micro-meter or sub-micro meter pixels, while also keeping the array camera, made up of one or more camera assemblies as thin as possible.

Figure 10B:
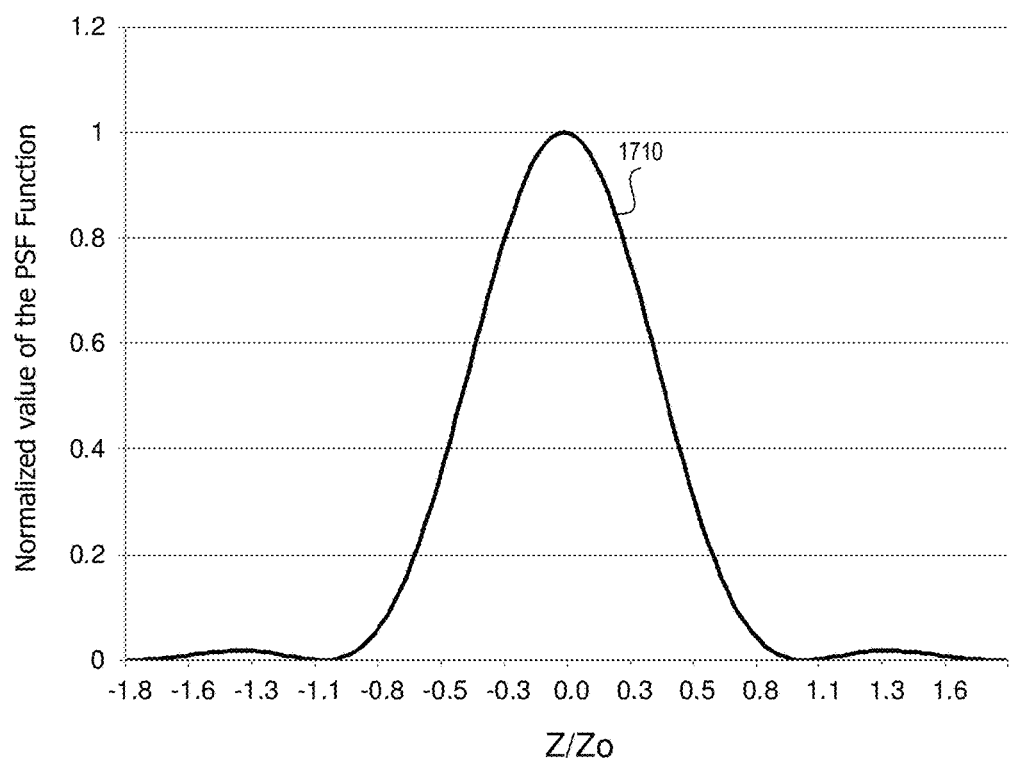
FIGS. 10B-10F illustrate Rayleigh performance criteria for image resolution.

The point spread function (PSF) is a measure of the resolving power of an optical system. The narrower the point spread function the better the resolution will be. As the name implies, the point spread function defines the spread of a point object in the object space when imaged and focused on an image plane. The degree of spreading of the point object in the object space on a focused image plane can be a measure for the quality of a lens assembly, such as L1-L6. The curves in the plots of FIGS. 10B-10E are examples illustrating how close two points in the object space can be before they are resolvable measures of the degree of spreading or blurring in a PSF response when focused on an image plane. In the graph of FIG. 10B:

$$Z_o = 1.22 * \lambda * (f/\#)$$

$$f/\# = f\text{-number} = EFL/(\text{Clear Aperture})$$

$$\lambda = \text{light wave-length} = 550 \text{ nm}$$

Figure 10C:
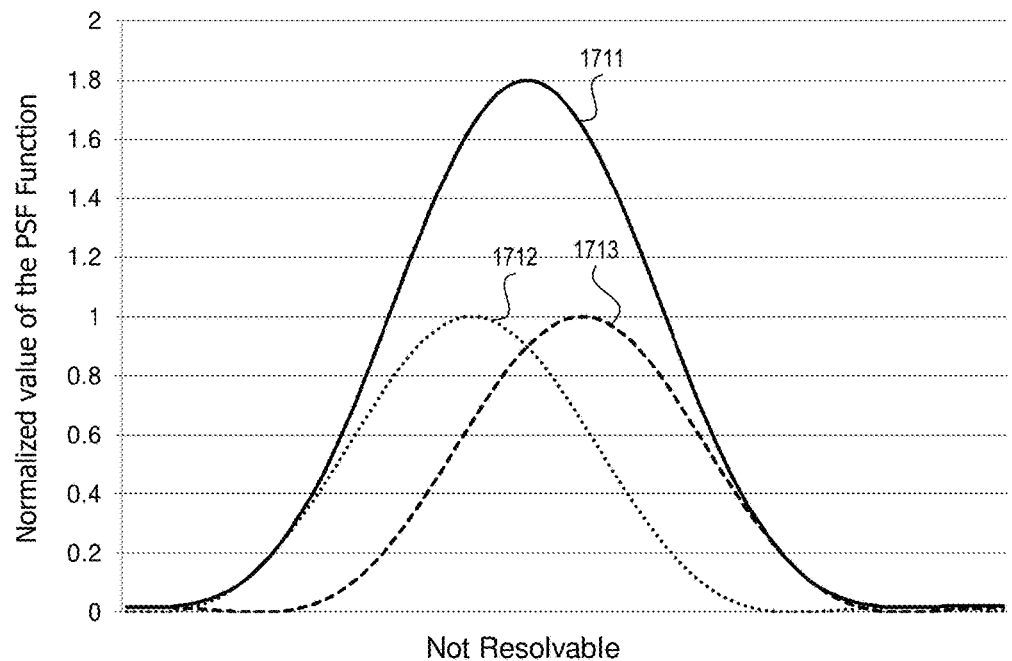

FIG. 10B illustrates a cross-sectional profile curve 1710 of a PSF function for one point in the object space, where the peak value of 1, as shown on the curve, is the maximum of the normalized PSF. FIG. 10C illustrates a graph of a PSF that is not resolved. In FIG. 10C, for example, two PSF curves 1712 and 1713 show independently two PSF curves of two adjacent points in the object space. They are close enough together the two PSF curves overlay each other. When these two curves 1712 and 1713 are added together the result is curve 1711, where the curve 1711 is slightly wider but it is difficult to tell if there are two points or only one point in the object space.

Figure 10D:
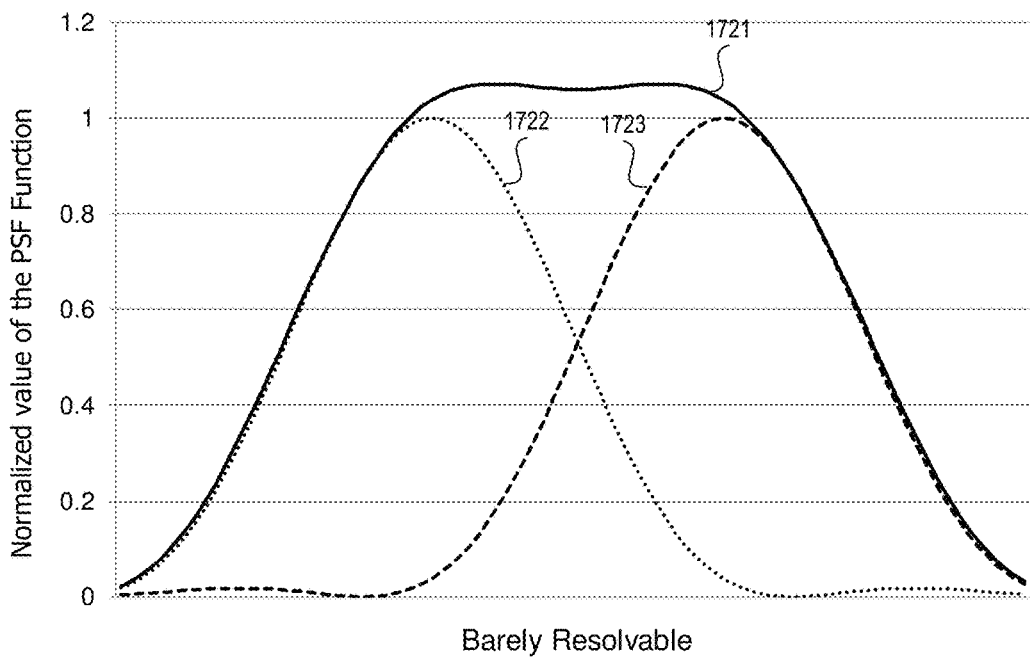
Figure 10E:
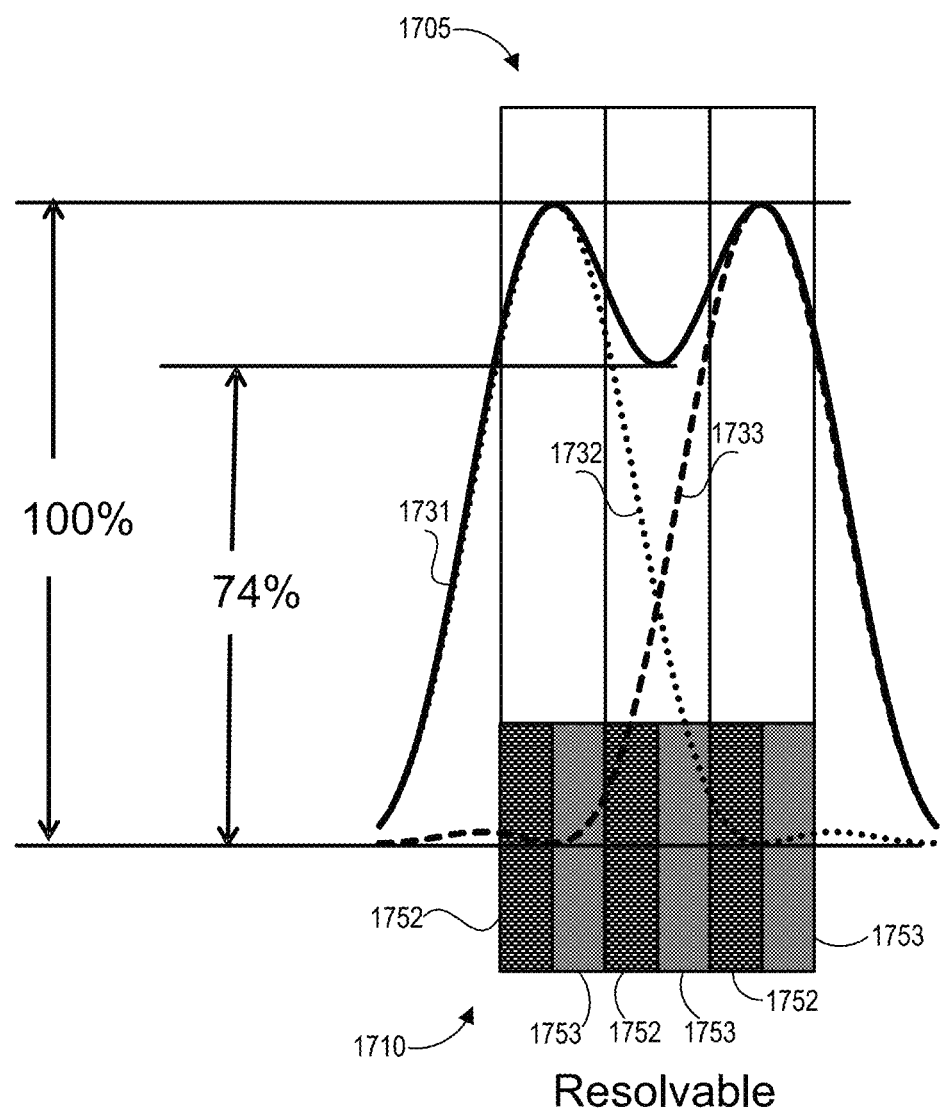

FIG. 10D illustrates a similar graph of two PSF patterns 1722 and 1723 separated far enough apart that when added together we get curve 1721, where we can barely resolve two adjacent object points. FIG. 10E is an example illustrating two PSF patterns 1732 and 1733 that overlay each other from two adjacent points in the object space, similarly to FIGS. 10C and 10D. In this example when added together we get curve 1731, which is typically considered as being resolvable, indicating there are two adjacent object points in the object space. The image sensor is then used, for example, to measure the levels of the light pattern imaged and focused on the image sensor image plane. As an example, there are adjacent vertical rectangle boxes 1705 that are shown laying over the two peaks shown in curve 1731 and the minimum between the two peaks. In order to measure these three light levels, for example, three pixels approximately within or near these two peaks and middle are required at a minimum. If these pixels are monochrome the light level being imaged on these pixels can be measured. The pixel area (for example, aperture) and time period of converting light photons to a signal, such as an electrical signal for example, can represent a measurement of the light level on a given pixel. In this way, for example, one can convert the light level on the image sensor pixel to an electrical signal, when averaged over a particular time period. Those skilled in the art may realize the sampling pixels of the image sensor array may spatially filter the light image pattern focused on the image plane of the image sensor. For example, averaging the light levels of one of the peaks of curve 1731 on one monochrome pixel may not yield an electrical signal comparable to the actual peak of the light level, rather it may be the integration of the light level across the area (for example, aperture) of a the pixel and the time period over which the light photons are captured by the pixel. Whereas, for the purposes of examples herein the area of a pixel surface is considered as the aperture of the pixel.

If, for example, one were to choose to take measurements enabling one to determine the color of the light spectrum being imaged on each monochrome pixel we may need to select a color pattern such as the Bayer color pattern where, for example, one would then add four pixels for each monochrome pixel where each of these four pixels will have one of the four light color filters Red, Green-red, Blue, Green-blue (for example, R, Gr, B and Gb) color filter pattern, which is typically the common way to reference the color filters of a Bayer color filter pattern. Those skilled in the art may be aware of such a pattern and how to convert the output of each of the color pixels R, Gr, B and Gb (for example, a RGrBGb pattern) to values representing color for these four pixels within the pixel represented by a monochrome pixel. In FIG. 10E you will see on horizontal pattern where the Gr pixel 1752 and the R pixel 1753 are adjacent to each other. Both Gr and R are repeated as a pair across the horizontal row shown in FIG. 10E. The B and Gb pixels are not shown because they are on a row just behind the Gr and R pixels, where behind means a plane just behind the plane of the FIG. 10E. Those skilled in the art may recognize the number of pixels in each row and column have now increased by two.

If, for example, we were to use a black and white target in the object space as a way to measure the resolution of a the lens assembly together with a the imager sensor array then one skilled in the art may recognized each color pixel would be able to measure the light imaged on the aperture of a the pixel, because black and white targets project wide enough light spectrum to cover the color filters spectrum of the R, Gr, B, and Gb color filters. In this way one may consider each of the color pixels as a separate sample of the image of the black and white target on the image sensor image plane.

Figure 10F:
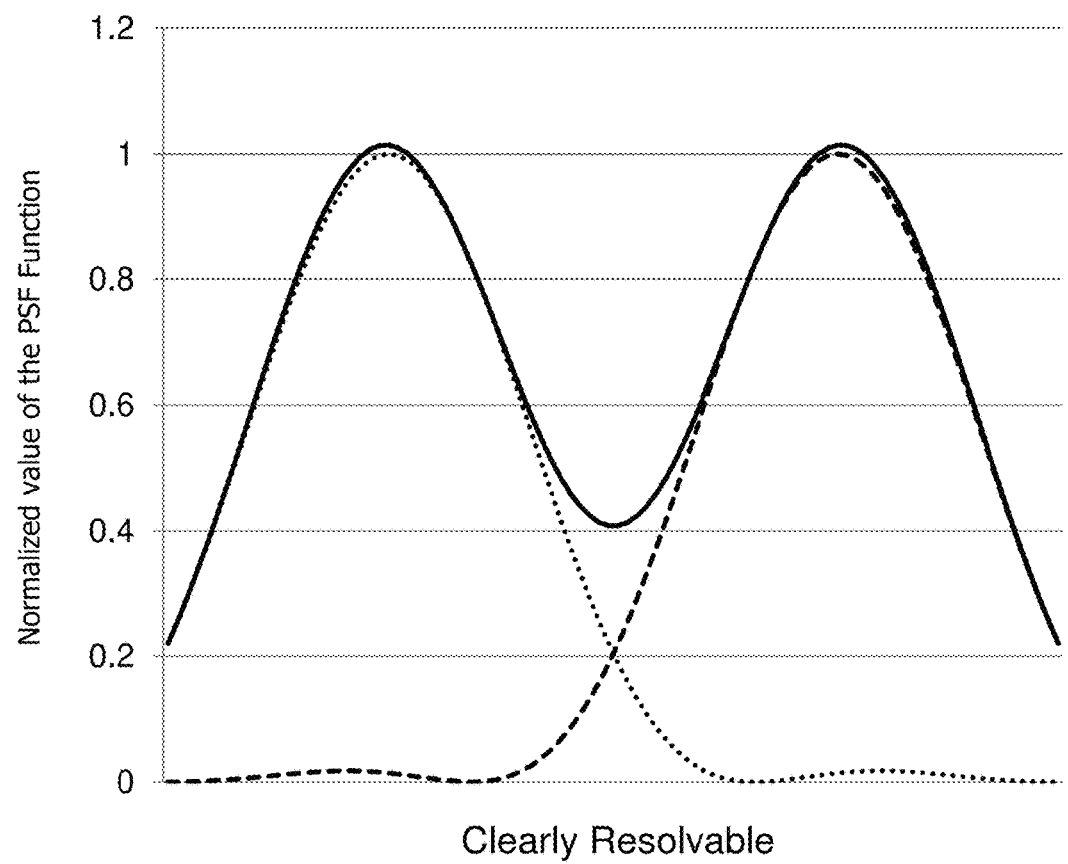

FIG. 10F illustrates and example of two adjacent point objects in the object space that are clearly resolvable.

The PSF performance of the lens assembly can be used to determine a suitable pixel pitch for use with the lens assembly. The folded optic array camera lens assemblies should be capable of resolving or clearly resolving the pixels of the corresponding sensor pixel size.

In one embodiment a folded optics single lens assembly without an image sensor can have, an EFL of 6.3, an f/# of 2.5, a FOV of 32 degrees, an image circle diameter of 3.56 mm, at a wavelength of 550 nanometers (nm). Such an optical lens assembly could be as system suitable for a monochrome square image sensor pixel pitch of for use with the L1-L6 or a similar lens assembly can be approximately 0.84 μm (micro-meter) on each horizontal and vertical sides of the pixel, and a suitable Bayer image sensor square pixel size pitch of approximately 0.42 μm on each side. Other factors can reduce the performance of such a lens assembly system to where it may not able to achieve the ideal MTF or PSF performance suitable for 0.84 μm monochrome pixels and or 0.42 Bayer color filter image sensor pixels.

Figure 11:
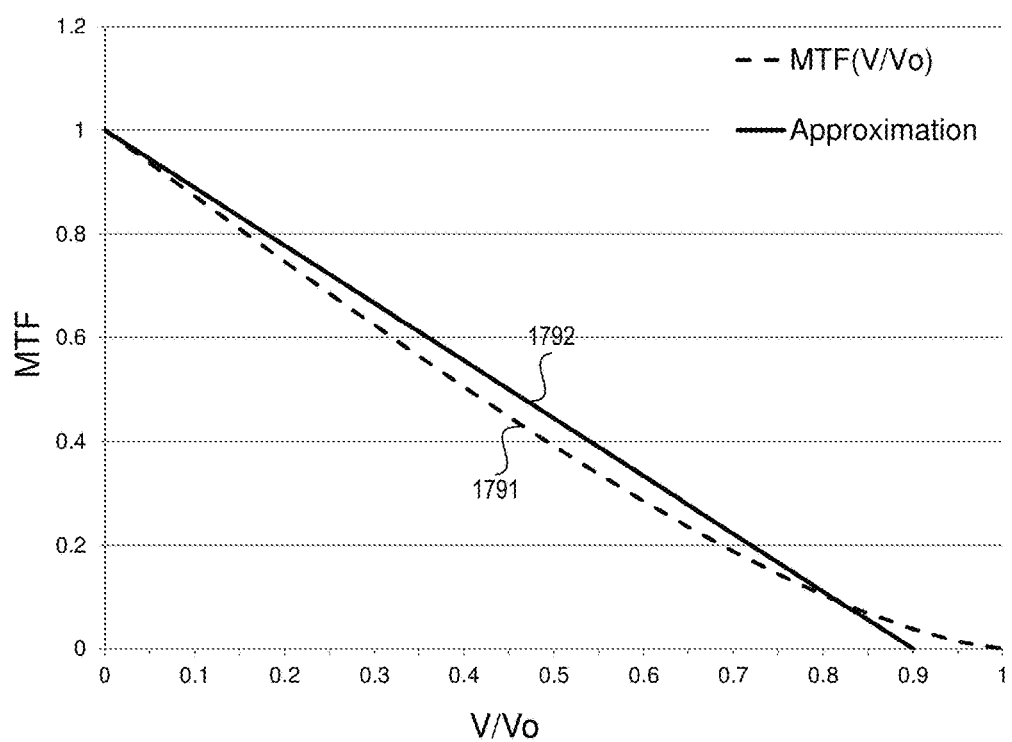
FIG. 11 illustrates diffraction limit performance data for an array camera with an optical system as described herein.

FIG. 11 illustrates diffraction limit performance data 1791 for a folded optics lens assembly where the aperture of the lens assembly, such as L1 to L6, has a circular aperture and the pattern used to measure the MTF performance of the lens assembly is a sinusoidal pattern. FIG. 11 also shows an approximation line 1792 drawn from the MTF of 1.0 to a point 0.9 on the abscissa, where the abscissa of the graph is in terms of V/Vo, where V represents a sinusoidal pattern with a spatial frequency of V cycles per mm and Vo represents the "Vanishing Point" where V has approximately zero (0) MTF. The array camera with a lens system as described herein, where a sinusoidal pattern in the object space is imaged on an image plane surface, where the sinusoidal pattern on the image plane is described in cycles per mm. For example, the camera array lens assemblies described herein, the vanishing point Vo may be approximately 727 cyc/mm as shown for curve 1791 and the intercept point of line 1792 on the abscissa being 654 cyc/mm, which is 90% of Vo.

Figure 12:
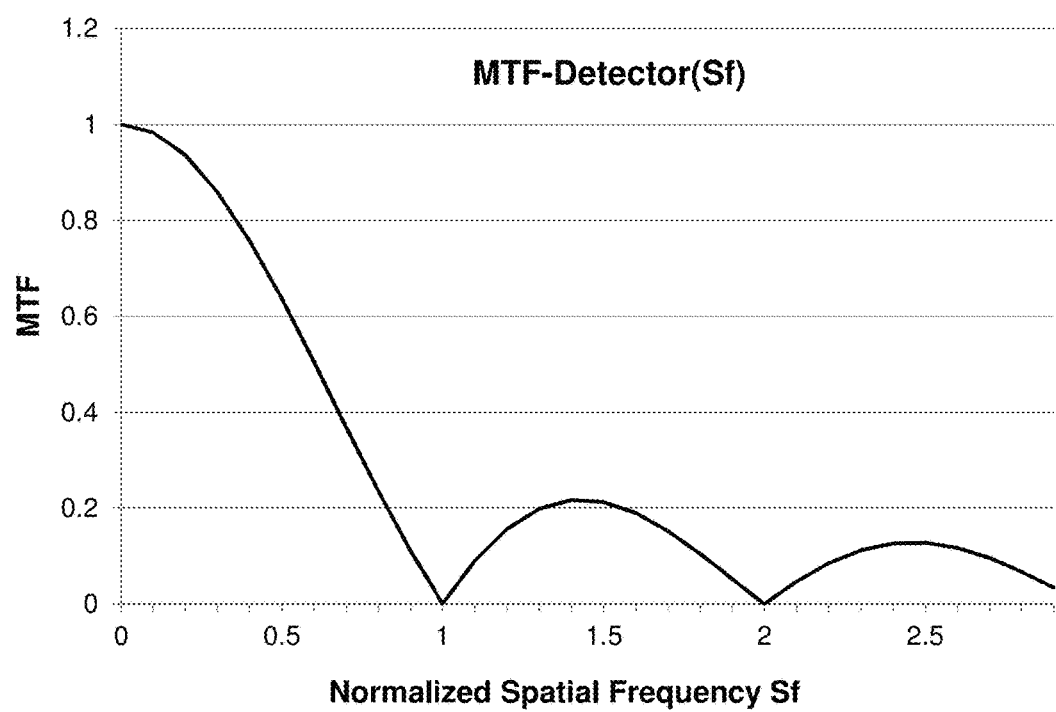
FIG. 12 illustrates MTF performance data for a single pixel.

FIG. 12 illustrates the theoretical normalized MTF spatial frequency response, based on sample theory, of an image sensor array when a sinusoidal light pattern is imaged along a row or column of pixels in the image sensor array. Those skilled in the art should recognize this is the theoretical response of a row or column of pixel samples based on sample theory. The equations for the normalized curve shown in FIG. 12 are:

$$MTF_{Detector}(Sf)=1, \text{ when } Sf=0.$$

The equation for this roll off is:

$$MTF_{Detector}(Sf)=abs(\sin(Pi*PW*Sf))/(PixelPitch*Sf)$$

where Sf is the normalize spatial frequency of the sinusoidal light pattern projected along a row or column on an image sensor array of square pixels, PW represents a square pixel width in the horizontal or vertical directions and PixelPitch represents the horizontal and vertical pixel pitch of the image sensor array. The pixel width is normally slightly less than the pixel pitch for a typical camera image sensor, but for the examples presented herein the pixel width is to be considered the same as the pixel pitch. A person having ordinary skill in the art should recognize the term "pixel width" may be determined by knowing the sensors pixel pitch and the common meaning of the term "fill-factor," where fill-factor is used when an image sensor has microlenses on each pixel. The micro-lens of each pixel is used to focus light on the photo sensitive area of the pixel. In some cases the fill-factor may be 80% or more of the area covered by each pixel and in some cases the fill-factor may be considered near 100% of the pixel area. In example embodiments in this disclosure, a fill-factor of 100% may be assumed unless stated otherwise or the context indicates otherwise.

Figures 13A, 13B:
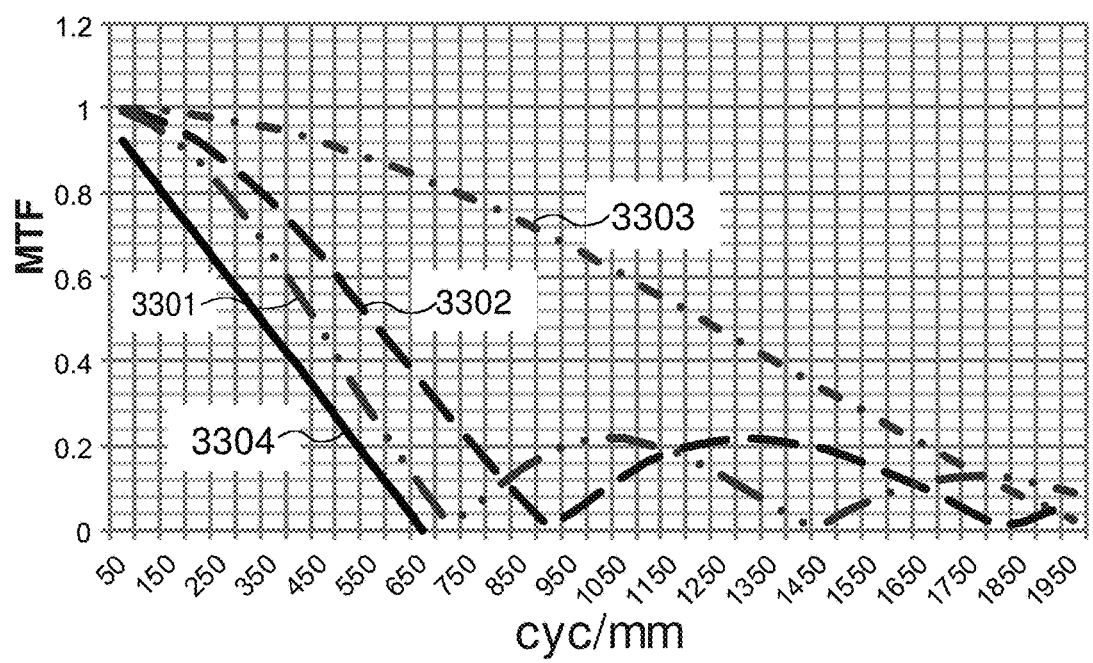
FIGS. 13A-13E illustrate MTF performance criteria for one embodiment of an optics and sensor combination.

FIGS. 13A-13E illustrate MTF performance criteria for a lens and sensor combination. The lens assembly can be the L1-L6 combination or any other lens system that satisfies the performance criteria described herein. FIG. 13A shows a table of the Nyquist sampling rates for an image sensor using a pixel pitch of 1.4 μm as shown in column 2001, for an image sensor using a pixel pitch of 1.1 μm as shown in column 2002, and for an image sensor using a pixel pitch of 0.5 μm as shown in column 2003.

Figure 13C:
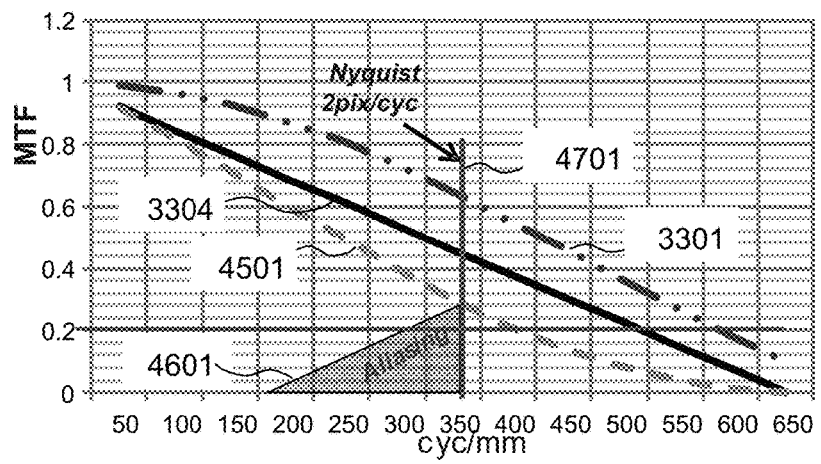
Figure 13D:
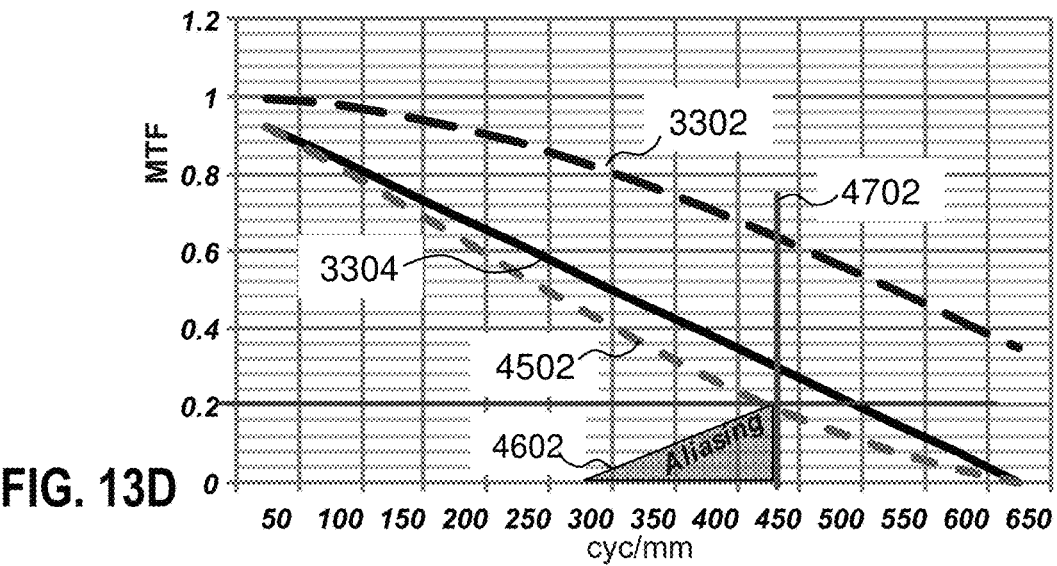
Figure 13E:
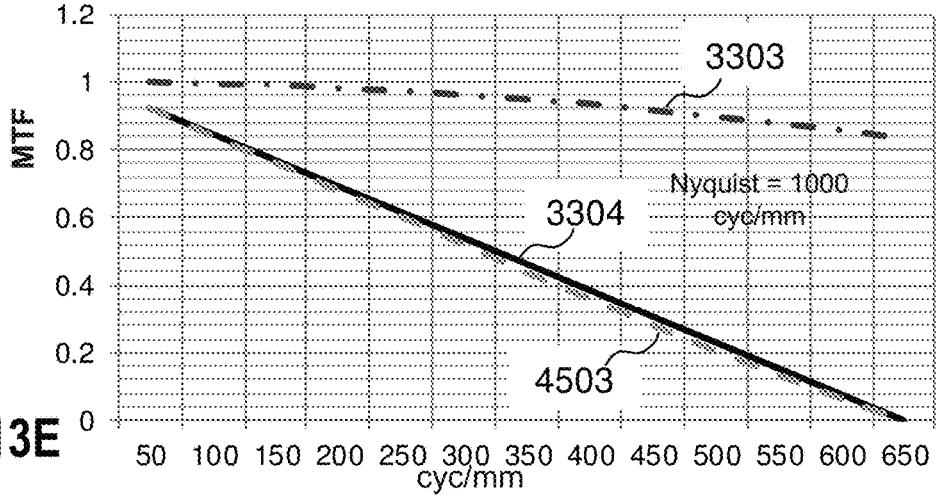

FIG. 13B shows the theoretical sampling MTF roll-off for three image sensor arrays that have horizontal and vertical image sensor pixel widths of 1.4 μm, 1.1 μm and 0.5 μm as shown in graphs 3301, 3302 and 3303 respectfully. Also shown in FIG. 13B is the line 3304 that approximates the diffraction limit for the L1 to L6 lens assembly described for 1792 of FIG. 11. FIG. 13C illustrates a zoomed-in view of the MTF roll-off 3301 for a the 1.4 μm square pixel image sensor array compared to the diffraction limit approximation 3304 for a the lens assembly L1-L6. FIG. 13D illustrates a zoomed-in view of the MTF roll-off 3302 for a 1.1 μm square pixel image sensor array compared to the diffraction limit approximation 3304 for a the lens assembly L1-L6. FIG. 13E illustrates a zoomed-in view of the MTF roll-off 3303 for a 0.5 μm square pixel image sensor array compared to the diffraction limit approximation 3304 for the lens assembly L1-L6.

The dashed lines 4501, 4502 and 4503 in each FIGS. 13C, 13D and 13E represent the product of the diffraction limit 3304 and the MTF roll-off corresponding with curves 3301, 3302 and 3303 in FIG. 13B. The solid vertical lines 4701 and 4702 represent the Nyquist sample rate for pixel pitch 1.4 μm and 1.1 μm respectfully. The triangles 4601 and 4602 approximately represent the aliasing fold back interference that result from aliasing. As illustrated by FIGS. 13C and 13D, aliasing can occur. Generally, aliasing interference below 20% MTF is acceptable in terms of not having noticeable aliasing artifacts. Never-the-less, details above Nyquist may fold back and interfere with frequencies below Nyquist regardless of if it is noticeable or not. Accordingly, a pixel pitch of 1.1 μm should produce acceptable results when used with a lens assembly L1-L6 as described herein. As illustrated in FIG. 13C a pixel pitch of 1.4 may produce undesirable visible (and noticeable) aliasing results when used with a lens assembly L1-L6 as described herein. This is because aliasing significantly above 20% MTF may produce visible aliasing artifacts.

As demonstrated by FIGS. 10A-13E, the Rayleigh's Criterion for resolution provides guidance on how to determine suitable pixel size for use with a L1-L6 or similarly performing lens assembly. However, lens aberrations effects can reduce the lens MTF performance from ideal and thereby increase the PSF response width. Therefore, a wider pixel size can be used to match the lens, due to the fact that the lens resolution is less than that of the ideal performance. If the lens performance is close to the diffraction limit, which would be similar to the performance of the ideal lens (assuming no aberrations and a circular aperture), then a smaller pixel can be used, provided that such high quality lenses can be reliably produced in manufacturing, for example in mass-manufacturing for use in a common mobile device.

Wafer optics inherently is capable of producing higher lens alignment accuracy, with higher yield, than that of the current stack barrel designs. The wider the pixel size the lower the pixel MTF resolution may be, simply because of sampling theory. Wider pixels can lower the Nyquist sampling rate, which can lead to more image aliasing or the need to lower the lens image MTF resolution around Nyquist in order to reduce the aliasing effects.

In conclusion, presented herein are methods and systems that may be used to implement high performance autofocus mass produced lens assemblies capable of matching a the present and future image sensor pixel pitch of approximately 1.4 μm to sub-micrometer pixels. For example, attaching L6 plus the sensor prism to the sensor or sensor clover glass one can focus the lens and achieve near diffraction limit performance suitable enough to accumulate pixels at least as small as 0.5 um square. Earlier solutions to move the lens elements with the objective to change the focal length may not provide the necessary performance needed to achieve the performance of the array camera as described here in for lens assembly L1-L6. Therefore, methods are needed to address a good solution for mass production of folded optics. The embodiment provided shows it can be done. The systems and methods described herein implement a field corrector, require precision assembly of the sensor prism or mirror, and an autofocus actuation/movement design that will provide the necessary precision performance as described above.

Terminology

Implementations disclosed herein provide systems, methods and apparatus for auto-focus in a multi-sensor folded optic system. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use embodiments of the invention. Various modifications to these implementations will be readily apparent to those skilled in the art, and the generic principles defined herein may be applied to other implementations without departing from the spirit or scope of the embodiments of the invention. Thus, embodiments are not intended to be limited to the implementations shown herein but are to be accorded the widest scope consistent with the principles and novel features disclosed herein.

What is claimed is:

1. An image capture apparatus comprising:
   means for sensing light;
   first light folding means positioned to receive the light and redirect the light in a first direction toward the means for sensing;
   an optical element comprising second light folding means positioned to receive the light from the first light folding means and redirect the light in a second direction toward the means for sensing;
   means for focusing the light, the means for focusing movably positioned between the first light folding means and the second light folding means;
   means for moving the means for focusing along the first direction between the first light folding means and the second light folding means; and
   field correcting means positioned between the second light folding means and the means for sensing light,
   wherein the means for moving is positioned to contact a portion of the optical element, and wherein the apparatus further comprises a friction reducing means provided between the means for moving and the optical element.

2. The apparatus of claim 1, further comprising means for capturing an image of a portion of a target scene, the means for capturing comprising the means for sensing, the first light folding means, the second light folding means, the means for focusing, the means for moving, and the field correcting means.

3. The apparatus of claim 2, further comprising a plurality of the means for capturing, each means for capturing for capturing an image of a different one of a plurality of portions of the target scene.

4. The apparatus of claim 3, further comprising means for combining the plurality of portions into a final image of the target scene.

5. The apparatus of claim 3, further comprising means for splitting incoming light representing the target scene into the plurality of portions, the means for splitting comprising the first light folding means of each of the plurality of means for capturing.

6. An image capture system comprising:
   a plurality of cameras disposed within a housing having an opening for receiving light representing a target image scene, each of the plurality of cameras operable to capture an image of a different one of a plurality of portions of the target scene, each camera of the plurality of cameras comprising:
   an image sensor;
   a first reflective surface positioned to redirect light representing one portion of the corresponding plurality of portions of the target scene in a first direction;
   an optical element having
      a guide surface, and
      a second reflective surface positioned to redirect the light from the first reflective surface in a second direction;
   at least one lens movably positioned between the first and second reflective surfaces;

a stationary lens positioned between the optical element and the image sensor, wherein the image sensor, stationary lens, and optical element are bonded into a stack;

an actuator operable to move the at least one lens along an optical axis extending between the first and second reflective surfaces; and a guide rail coupled to the actuator and the at least one lens, the guide rail positioned to slidably engage the guide surface to constrain motion of the at least one movable lens away from the optical axis or rotating around the optical axis.

7. The system of claim 6, the camera further comprising a cover glass affixed to the image sensor between the image sensor and the stationary lens, the stack comprising the cover glass.

8. The system of claim 6, further comprising a substantially flat substrate, the stack of each of the plurality of cameras coupled to the substrate with the image sensor embedded into a slot in the substrate.

9. The system of claim 6, further comprising a processor operable to execute instructions for generating a final image of the target scene by at least stitching the plurality of portions into a stitched image and cropping the stitched image into the final image.

10. The system of claim 6, wherein the guide rail slidably engages the guide surface of the optical element.

11. The system of claim 6, further comprising a substantially flat substrate, the image sensor of each of the plurality of cameras positioned on or within a slot of the substantially flat substrate, and wherein the actuator is coupled to the substrate.

12. An image capture system comprising:

a plurality of cameras disposed within a housing having an opening for receiving light representing a target image scene, each of the plurality of cameras operable to capture an image of a different one of a plurality of portions of the target scene, each camera of the plurality of cameras comprising:

an image sensor;

a first reflective surface positioned to redirect light representing one portion of the corresponding plurality of portions of the target scene in a first direction;

an optical element having a second reflective surface positioned to redirect the light from the first reflective surface in a second direction;

at least one lens movably positioned between the first and second reflective surfaces; and a stationary lens positioned between the optical element and the image sensor, wherein the stationary lens comprises a field corrector lens, and wherein the image sensor, stationary lens, and optical element are bonded into a stack.

13. An image capture device comprising:

an image sensor;

a first reflective surface positioned to redirect light representing a portion of light representing a target scene in a first direction toward the image sensor;

an optical element having an input surface positioned to receive the light from the first reflective surface, a second reflective surface positioned to redirect the light in a second direction toward the image sensor, an output surface through which light redirected by the second reflective surface propagates in the second direction toward the image sensor, and a guide surface opposing the output surface and positioned parallel to a plane formed by the image sensor;

at least one lens movably positioned between the first and second reflective surfaces;

a guide rail coupled to the at least one lens, the at least one guide rail positioned to slidably engage the guide surface to constrain motion of the at least one movable lens away from the optical axis or rotating around the optical axis; and a stationary lens positioned between the output surface of the optical element and the image sensor, wherein the image sensor, stationary lens, and optical element are bonded into a stack.

14. The device of claim 13, wherein the stationary lens comprises a field corrector lens.

15. The device of claim 13, further comprising a cover glass affixed to the image sensor between the image sensor and the stationary lens, the stack comprising the cover glass.

16. The device of claim 13, further comprising an actuator operable to move the at least one lens along an optical axis extending between the first and second reflective surfaces; and wherein the guide rail is coupled to the actuator.

17. The device of claim 16, further comprising a friction reducing component between the guide surface and the guide rail.

* * * * *